US012281393B2

(12) United States Patent
Mccall et al.

(10) Patent No.: US 12,281,393 B2
(45) Date of Patent: Apr. 22, 2025

(54) COLD SPRAY OF BRITTLE MATERIALS

(71) Applicants: Lawrence Livermore National Security, LLC, Livermore, CA (US); Richard Thuss, Berryville, VA (US)

(72) Inventors: Scott K. Mccall, Livermore, CA (US); Alexander A. Baker, Pleasanton, CA (US); Harry Radousky, San Leandro, CA (US); Richard Thuss, Berryville, VA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 136 days.

(21) Appl. No.: 16/684,441

(22) Filed: Nov. 14, 2019

(65) Prior Publication Data

US 2020/0157689 A1 May 21, 2020

Related U.S. Application Data

(60) Provisional application No. 62/862,529, filed on Jun. 17, 2019, provisional application No. 62/768,707, filed on Nov. 16, 2018.

(51) Int. Cl.
*C23C 24/04* (2006.01)
*B05B 7/14* (2006.01)
(Continued)

(52) U.S. Cl.
CPC ............ *C23C 24/04* (2013.01); *B05B 7/1486* (2013.01); *H01F 1/01* (2013.01); *H01F 10/26* (2013.01)

(58) Field of Classification Search
None
See application file for complete search history.

(56) References Cited

U.S. PATENT DOCUMENTS 5,686,185 A * 11/1997 Correll ................. C08G 59/686 427/386
6,432,416 B1 * 8/2002 Cummings ............ A01N 25/34 424/617

(Continued)

FOREIGN PATENT DOCUMENTS

JP 2013161829 A * 8/2013

OTHER PUBLICATIONS

Yamada, M. et al. "Cold Spraying of TiO2 Photocatalyst Coating With Nitrogen Process Gas". J of Thermal Spray Technology, vol. 19(6) (Dec. 2010), pp. 1218-1222. (Year: 2010).*

(Continued)

*Primary Examiner* — Alexander M Weddle
(74) *Attorney, Agent, or Firm* — Zilka-Kotab, P.C.

(57) ABSTRACT

In one aspect of an inventive concept, a product includes a substrate and a material formed from a precursor powder, where the material includes a plurality of particles from the precursor powder deposited on the substrate. The plurality of particles have structural characteristics defined by an impact of the particles on the substrate and/or on previously deposited particles. Moreover, the material has a microstructure, where the microstructure of the material is substantially the same as a microstructure of the precursor powder. The microstructure of the material is characterized by at least one property, where the at least one property is substantially the same as a corresponding at least one property of the precursor powder.

23 Claims, 11 Drawing Sheets

(51) Int. Cl.
*H01F 1/01* (2006.01)
*H01F 10/26* (2006.01)

(56) References Cited

U.S. PATENT DOCUMENTS

| | | | | |
|---|---|---|---|---|
| 7,097,885 | B2 | 8/2006 | Leonardi et al. | |
| 9,306,146 | B2 | 4/2016 | Thuss | |
| 10,714,671 | B2 | 7/2020 | Thuss | |
| 10,957,840 | B2 | 3/2021 | Thuss | |
| 2002/0182311 | A1* | 12/2002 | Leonardi | H02K 15/03 427/128 |
| 2006/0121187 | A1 | 6/2006 | Haynes et al. | |
| 2006/0222862 | A1 | 10/2006 | Akedo et al. | |
| 2016/0076797 | A1* | 3/2016 | Boeder | F25B 21/00 62/3.1 |
| 2018/0204677 | A1* | 7/2018 | Celik | H01F 41/0293 |

OTHER PUBLICATIONS

Folks, L. et al.. "Magnetocaloric dependence of magnetic viscosity measurments in NdFeB". J App. Physics 75, 6634-6636 (1994). (Year: 1994).*

Makarova, L et al. "Composite multiferroic materials consisting of NdFeB and PZT particles embedded in elastic matrix: the appearance of electrical polarization in a constant magnetic field". EPJ Web of Conferences 185, 07008 (2018) MISM 2017 (Published online Jul. 4, 2018) (Year: 2018).*

Lamarre et al., "Permanent Magnets Produced by Cold Spray Additive Manufacturing for Electric Engines," Journal of Thermal Spray Technology, Sep. 19, 2019, 9 pages.

Glass et al., "Magnetostrictive Cold Spray Sensor for Harsh Environment and Long-Term Condition Monitoring," 45th Annual Review of Progress in Quantitative Nondestructive Evaluation, vol. 38, AIP Conference Proceedings 2102, May 8, 2019, pp. 020018-1: 020018-8.

Lou et al., "Electroststically tunable magnetoelectric inductors with large inductance tunability," Applied Physics Letters, vol. 94, No. 112508, Mar. 19, 2009, pp. 112508-1: 112508-3.

Bernier et al., "Metal-NdFeB composite permanent magnets produced by cold spray," EVS29 International Battery, Hybrid and Fuel Cell Electric Vehicle Symposium, Jun. 19-22, 2016, pp. 1-9.

Engineering, "Cold Spray Additive Offers New Fabrication Process for Permanent Magnets," Engineering.com, Jan. 26, 2018, 7 pages, retrieved from https://www.engineering.com/AdvancedManufacturing/ArticleID/16398/Cold-Spray-Additive-Offers-New-Fabrication-Process-for-Permanent-Magnets.aspx.

Magnequench, "Magnequench is the industry leader in bonded neo magnetic powders, magnets, and their applications," Magnequench International LLC, accessed on Nov. 14, 2019, 6 pages, retrieved from https://mqitechnology.com/.

Metal Am, "Permanent magnets for electric motors by cold spray Additive Manufacturing," Inovar Communications Ltd, Jan. 26, 2018, 6 pages, retrieved from https://www.metal-am.com/permanent-magnets-electric-motors-cold-spray-additive-manufacturing/.

Watkin, H., "Researchers Create Permanent Magnets with Cold Spray Additive Manufacturing," All3DP, Jan. 29, 2018, retrieved from https://all3dp.com/researchers-create-permanent-magnets-cold-spray-additive-manufacturing/.

Mccall et al., "Temperature and Field Induced Strain Measurements in Single Crystal Gd5Si2Ge2," Journal of The Minerals, Metals & Materials Society, vol. 68, No. 6, Mar. 29, 2016, pp. 1589-1593.

U.S. Appl. No. 16/399,560, filed Apr. 30, 2019.

International Preliminary Examination Report from PCT Application No. PCT/US2019/061773, dated May 27, 2021.

International Search Report and Written Opinion from PCT Application No. PCT/US2019/061773, dated Mar. 10, 2020.

U.S. Appl. No. 16/894,098, filed Jun. 5, 2020.

U.S. Appl. No. 63/064,972, filed Aug. 13, 2020.

U.S. Appl. No. 63/093,744, filed Oct. 19, 2020.

* cited by examiner craters

COLD SPRAY OF BRITTLE MATERIALS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing, and more particularly, this invention relates to cold spray of brittle materials, in particular to cold spray of magnetic material to form coercive magnets.

BACKGROUND

Most rare earth element permanent magnets are produced through a process that includes producing sintered powders. In the case of neodymium-iron-boride (NdFeB) magnets, obtaining the desired grain structure typically involves melt spinning and/or hydrogenation-disproportionation-desorption-recombination (HDDR) to create the fine grain structure needed to create and retain a high coercivity. Many additive approaches to powder metallurgy involve directed energy beams which melt the powder, thereby destroying the desired grain structure.

Current magnet manufacturing proceeds through crystal growth, grinding, pressing, aligning and sintering, an inherently wasteful process exacerbated by the extreme brittleness of the materials involved, such as over 25% for bulk parts, rising to 50% for millimeter scale components or up to 90% for prototype of the material is lost when making millimeter scale parts. In addition, many proprietary optimization steps need to be performed to improve the high-temperature performance of the magnets, including grain boundary diffusion of dopants and careful control of particle size.

Additive manufacturing approaches such as binder-jetting, direct ink write and selective laser melting all seek to address this process, but each introduce their own limitations. For example, the high volume fraction of binder (~30%) significantly reduces the energy density of the magnets, while laser melting destroys the delicate microstructure essential to good magnetic properties. These methods have failed to demonstrate the net-shape deposition of high-energy product permanent magnets.

Cold spray, by contrast, does not generally melt the powders and so the microstructure can largely be preserved intact, enabling a coercive material.

However, cold spray is not generally very effective working with brittle materials as the plastic deformation of particles that leads to them adhering to one another is not nearly as effective, so many functional materials, such as the permanent magnet materials $Nd_2Fe_{14}B$, $SmCo_5$, $Sm_2Co_{17}$ and alloys based on these structures have not historically been good candidates for cold spray.

Recent studies have shown an approach of cold spray metal additive manufacturing of NdFeB powders. In these studies, an aluminum-NdFeB composite is used, which may enable spraying, however, the aluminum may severely degrade magnetic performance by reducing the volume fraction of NdFeB.

An approach to cold spray of brittle material to form magnets with high coercivity and maximum energy density remains elusive.

SUMMARY

In one aspect of an inventive concept, a product includes a substrate and a material formed from a precursor powder, where the material includes a plurality of particles from the precursor powder deposited on the substrate. The plurality of particles have structural characteristics defined by an impact of the particles on the substrate and/or on previously deposited particles. Moreover, the material has a microstructure, where the microstructure of the material is substantially the same as a microstructure of the precursor powder. The microstructure of the material is characterized by at least one property, where the at least one property is substantially the same as a corresponding at least one property of the precursor powder.

In another aspect of an inventive concept, a method for forming a material using a cold spray technique includes pressurizing a gas, heating the pressurized gas to a temperature below a melting temperature of the material, and directing a gas stream comprising the gas and a powder through an outlet of a nozzle toward a substrate for depositing the powder onto the substrate, where the powder includes a plurality of brittle particles having an irregular shape.

Other aspects and advantages of the present invention will become apparent from the following detailed description, which, when taken in conjunction with the drawings, illustrate by way of example the principles of the invention.

DETAILED DESCRIPTION

Figure 1A:
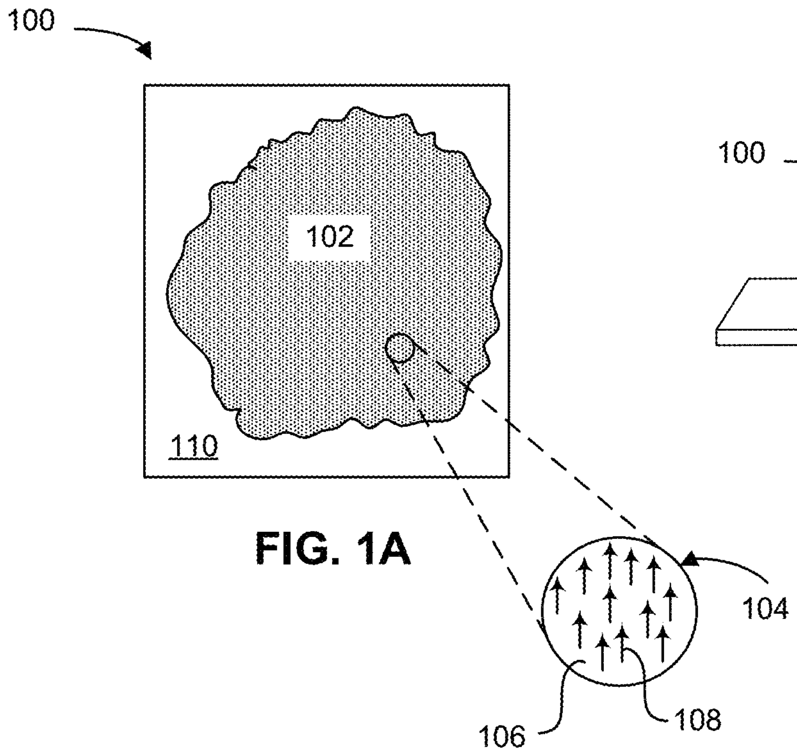
FIG. 1A is a schematic drawing of a top down view of a product, according to one aspect of an inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms “a,” “an” and “the” include plural referents unless otherwise specified.

As also used herein, the term “about” denotes an interval of accuracy that ensures the technical effect of the feature in question. In various approaches, the term “about” when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is noted that ambient room temperature may be defined as a temperature in a range of about 20° C. to about 25° C.

It is also noted that, as used in the specification and the appended claims, wt % is defined as the percentage of weight of a particular component is to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of a compound.

As described herein, “substantially” is used as an approximation to a significant extent, as would be understood by one skilled in the art.

A nanoscale is defined as having a diameter or length less than 1000 nanometers (nm).

The following description discloses several preferred aspects of an inventive concept of forming permanent magnets using cold spray techniques and/or related systems and methods.

In one general aspect of an inventive concept, a product includes a substrate and a material formed from a precursor powder, where the material includes a plurality of particles from the precursor powder deposited on the substrate. The plurality of particles have structural characteristics defined by an impact of the particles on the substrate and/or on previously deposited particles. Moreover, the material has a microstructure, where the microstructure of the material is substantially the same as a microstructure of the precursor powder. The microstructure of the material is characterized by at least one property, where the at least one property is substantially the same as a corresponding at least one property of the precursor powder.

In another general aspect of an inventive concept, a method for forming a material using a cold spray technique includes pressurizing a gas, heating the pressurized gas to a temperature below a melting temperature of the material, and directing a gas stream comprising the gas and a powder through an outlet of a nozzle toward a substrate for depositing the powder onto the substrate, where the powder includes a plurality of brittle particles having an irregular shape.

A list of acronyms used in the description is provided below.

Ar Argon
B Boron
C Celsius
cm centimeter
Co Cobalt
CO Carbon monoxide
$CO_2$ Carbon dioxide
Cu Copper
Dy Dysprosium
Fe Iron
g gram
g/$cm^3$ gram/centimeter cubed, density
Gd Gadolinium
Ge Germanium
$H_2$ Hydrogen gas
$H_c$ Coercivity
He Helium
HEBM High Energy Ball Milled
HDDR hydrogenation-disproportionation-desorption-recombination
kG kilo Gauss
kOe Kilo oersted
MCE Magnetocaloric effect
MGOe Mega-Gauss-Oersted
mg milligram
ml milliliter
mm millimeter
$N_2$ Nitrogen gas
NdFeB Neodymium Iron Boride
Ni Nickel
nm nanometer
Oe oersted
psi pound-force per square inch
PZT Lead zirconate titanate
rpm revolutions per minute
Si Silicon
Sm Samarium
T Tesla
Tb Terfenol
μm micron
vol volume
Xe Xenon The following description discloses several preferred aspects of an inventive concept of using powders of brittle materials and a method of cold spray of these powders to form materials having complex shapes. In one approach, the method of cold spray deposition may be applied to brittle materials. For example, as described herein, the method of cold spray may be applied to magnetic powders to form coercive magnetics.

Cold spray is a technique where fine powders including particles (having a diameter of about 5 microns (μm) to about 50 μm) are entrained in a carrier gas stream and accelerated to supersonic velocities where the particles may be deposited onto a substrate. Furthermore, conventional cold spray techniques include particles having a spherical in shape. The particles may be directed onto a surface where the particles adhere to the surface and each other thereby enabling structures to be built. Traditionally, cold spray has been limited to the realm of ductile particles and similar surfaces (e.g. aluminum particles sprayed onto an aluminum surface). Upon contact, the particles undergo localized shear straining and localized heating which enables the deposited particles to deform and adhere thereby resulting in the formation of structures approaching full density. Conventional techniques perform poorly with brittle materials. As described herein, a novel approach to cold spray deposition methodology allows cold spray of brittle materials, for example, permanent magnetic material.

According to one aspect of an inventive concept, a modified cold spray method demonstrates deposition of brittle particles onto both ductile and brittle surfaces thereby allowing application of cold spray to entirely new classes of materials, particularly functional materials (materials which possess useful properties that make them useful for specific applications) which are often brittle. Brittle may be defined as hard, liable to break easily, non-ductile, material conducive to fracturing, material that does not stretch, etc. as would be understood by one skilled in the art. The advantages of cold spray include the ability to produce complex shapes, and the ability to deposit materials on complex surfaces (e.g. around the exterior surface of a pipe).

Moreover, the techniques described herein may circumvent many of the outstanding challenges faced by additive manufacturing of magnet materials, achieving binder-free near-full density deposition without a reduction in properties, as well as sharply reducing waste.

Figure 1B:
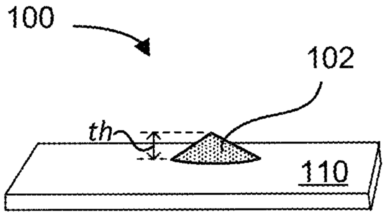
FIG. 1B is a schematic drawing of a perspective view of a product, according to one aspect of an inventive concept.

FIGS. 1A-1B depict a product 100, in accordance with one aspect of an inventive concept. As an option, the present structure of the product 100 may be implemented in conjunction with features from any other aspect listed herein, such as those described with reference to the other FIGS. Of course, however, such a product 100 and others presented herein may be used in various applications and/or in permutations which may or may not be specifically described in the illustrative embodiments listed herein. Further, the product 100 presented herein may be used in any desired environment.

According to one aspect of an inventive concept, a product includes a substrate and a material formed from a precursor powder. The material includes a plurality of particles from the precursor powder deposited on the substrate, where the plurality of particles have structural characteristics defined by an impact of the particles on the substrate and/or on previously deposited particles. Moreover, the material has a microstructure substantially the same as a microstructure of the precursor powder used to form the material.

As shown in the schematic drawing of FIGS. 1A-1B, a product 100 includes a substrate 110 and a material 102 formed from a precursor powder.

Figure 2A:
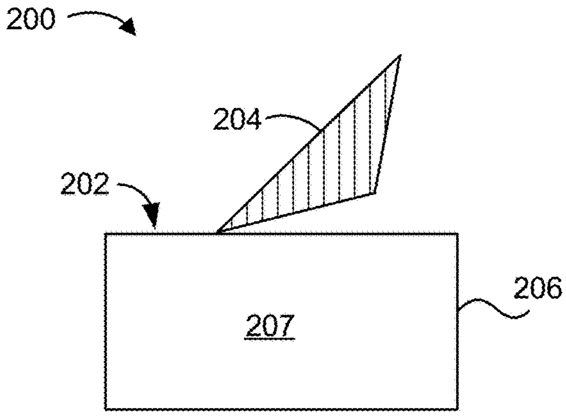
FIG. 2A is a schematic drawing of a cold sprayed particle just prior to impacting a substrate, according to one aspect of an inventive concept.
Figure 2B:
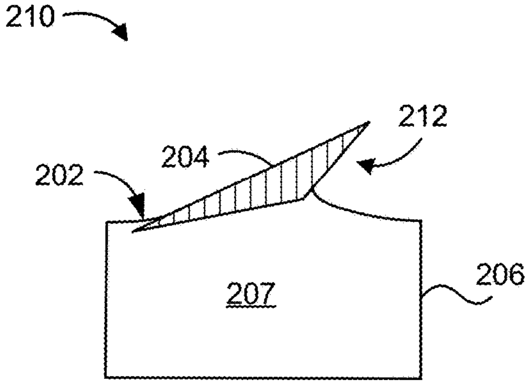
FIG. 2B is a schematic drawing of the deformation that occurs to both the cold sprayed particle and the substrate shown in FIG. 1C after the particle has impacted and then adhered to the substrate, according to one aspect of an inventive concept.
Figure 2C:
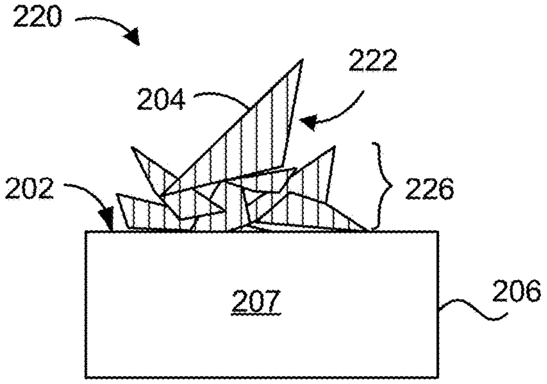
FIG. 2C is a schematic drawing of a packing formation that occurs with the plurality of particles being deposited at supersonic velocity on a substrate just after the impact of the particle and substrate of FIG. 1C, according to one aspect of an inventive concept.

FIGS. 2A-2C depict schematic drawings of a particle view of the deposition of the particles of the precursor powder on the substrate, according to some aspects of an inventive concept. Starting with FIG. 2A, depicts a schematic drawing of a “before” state 200 of a particle 204 of the precursor powder. In some approaches, the particle 204 may be described as a brittle particle, a shard, etc. FIG. 2A illustrates the particle 204 has been accelerated to supersonic velocity by the cold spray system just prior to impacting a surface 202 of the substrate 206 of the (as described herein, see cold spray system 500 shown in FIG. 5). In some approaches, the plurality of particles deposited on the substrate have structural characteristic defined by an impact of the particles on the substrate and/or on previously deposited particles.

In one approach, the impact of the particles being deposited onto the substrate may result in a structural deformation of the particles and the substrate, as illustrated in the just after impact state having deformation 210 in FIG. 2B. The just after impact state having deformation 210 illustrates a structural deformation of the particle 204 and the substrate 206 following impact of the particle at supersonic velocity. In one approach, the structural deformation of the particle 204 may represent the particle 204 being adhered to the surface 202 substrate 206. In one approach, the particle 204 has a deformed structure 212 and may be embedded within the substrate 206. In one approach, the surface 202 of the substrate 206 may have a deformed shape following the impact of the particle 204 at supersonic velocity. In one approach, the particle 204 may form a strong bond with the material 207 of the substrate 206.

In some approaches, the structural characteristics of the particle following impact of the particle on the substrate may include a deformation of the particle, a condensation of the size of the particle, a cleaving of the particle, a shattering of the particle, a splintering of the particle, a fracturing of the particle, etc.

In another approach, the impact of the particle being deposited onto the substrate may result in a packing of the deposited particles and the substrate, as illustrated in the just after impact state having particle packing 220 in FIG. 2C. The just after impact state having particle packing 220 illustrates a packing of the particle 204 on the substrate 206 following impact of the particle at supersonic velocity. The particle 204 may be deposited on already formed layers 226 of deposited particles. In one approach, the deposition of the particle 204 at supersonic velocity may not change the shape 222 of the particle. In one approach, the surface 202 of the substrate 206 may not have a deformed shape following the impact of the particle 204 at supersonic velocity. In one approach, the particle 204 may form a strong bond with the particles in already formed layers 226 of deposited particles. In one approach, the particle may form a strong bond with the substrate (e.g., a bond is formed between the particle 204 and the material 207 upon impact).

In various approaches, the adhesion of the particles to the substrate as well as the continued adhesion and buildup of new deposited particles to the previously deposited material may form a solid state of particles and substrate. In one approach, the successful initial and continued deposition may depend on the malleability of the particles.

In one approach, following impact of the particle at supersonic velocity onto a substrate may result in a combination of particles being structurally deformed by the impact, as illustrated in FIG. 2B, and of particles forming a structure having packing order from impact, as illustrated in FIG. 2C.

Looking back to FIG. 1A, the material 102 has a microstructure that may be characterized by at least one property, where the at least one property may be substantially the same (e.g., greater than 90%) as a corresponding property of the precursor powder. It has been surprising that the brittle particles are able to adhere to a substrate by an impact at supersonic velocity without losing the microstructure of the particle before the cold spray process. It is unknown how it is possible that the brittle material adheres to the surface and enables three-dimensional deposits on a substrate, without loss of material properties. Without wishing to be bound by any theory, it is believed that the force of impact of the particle into the substrate is sufficient to adhere the particles to the substrate to form the material, but the force is insufficient to alter the microstructure of the particle and/or substrate prior to impact.

In various approaches, the cold spray method as described herein causes the particles of the precursor powder to adhere to a substrate without changing the microstructure of the particles and the substrate after impact. In some approaches, the primary deposition process occurs as a result of an initial mechanical interlocking followed by a compaction process where the precursor particles upon impact may realign and/or experience some deformation to achieve a deposition of the brittle material approaching the full density of the precursor material.

In some approaches, the impact of the particles of the precursor powder into the substrate may cause a change in structure characteristics of the particles and the substrate to an effective extent that results in adherence of the particle to the substrate and already deposited particles. An effective extent of change in structural characteristics means that enough change has occurred in the particles and substrate to result in a discernable change in the structure of the deposited particles and substrate different from the original structural characteristics of the particles of the precursor powder and the substrate prior to deposition of the particles. The boundary of the underlying substrate of the material may be defined by the impact of the particles into the substrate. In one approach, the boundary of the substrate may represent the surface of the substrate before impact of the particles. In one approach, the shape of the substrate boundary may be defined by the impact of the particles into the substrate.

In some approaches, the extent of change of structure characteristics of the particles and substrate following deposition by a cold spray process described herein may result in amalgamation, conglomeration, densification, etc. of the particles to form a cohesive part. In some approaches, the impact of the particles of the precursor powder into the substrate may cause a change in structure characteristics of the particles to a greater than 50% change in original density of the powder material.

In one approach, the cold spray method of forming the material causes the particles of the precursor powder to adhere to the substrate and other already deposited particles without an additive, e.g., an adhesion factor, binder, etc.

In one approach, the material may include a magnetic material, and as depicted in the magnified view 104 of FIG. 1A, the microstructure 106 of the material may be characterized by at least one property, such as at least one of the following properties: the spins 108 remain aligned in the absence of a magnetic field (e.g., remnant magnetization), the spins 108 are difficult to flip (e.g., coercivity), etc.

In one approach, in a magnetic material, the property may include remnant magnetization, coercivity, density, etc. and at least one of these properties may be substantially the same as the remnant magnetization, coercivity, density, etc. of the precursor magnetic powder used to form the material.

The microstructure of magnetic material provides two key parameters of a permanent magnet: 1) the magnetic remanence, i.e., how many spins have lined up and do the spins remain lined up when the field is removed, and 2) the coercivity of the material, i.e., how hard is it to flip those spins into a different direction. A soft magnet in the presence of an opposing field may have spins that are easily flipped. In sharp contrast, a hard magnet, typically a permanent magnet has spins that are hard to flip and thus when pushed with a very large magnetic field the spins of the magnet still push back. In some cases, a plurality of grain boundaries in a magnet prevent magnetic domains from flipping. In one approach, a microstructure of a strong, permanent magnet may include a fine grain structure having a plurality of grain boundaries. In one approach, the microstructure retains a combination of properties, e.g., coercivity and remanence.

FIG. 1B is a schematic drawing of a perspective view a product 100 deposited on a substrate 110, wherein the product includes the material 102. In one approach, a thickness th of the material 102 may be in a range of greater than about 10 μm to less than about one centimeter (cm). In one approach, a thickness of the material may be about a thickness (e.g., diameter) of one particle of the precursor powder (see FIG. 6 for examples of particles of the precursor powder). In one approach, the thickness of the material may be in a range of greater than 500 nanometers (nm) to about 20 μm, depending on the diameter of an average particle of the precursor powder.

In one approach, the microstructure of permanent magnet materials is critical to retaining large coercivities (the resistance of a magnet to demagnetization) and thus cold spray deposition of magnetic material is a desirable technique for additive manufacture of magnets. In a preferred approach, the particles of magnetic material do not melt during deposition, and thus, the microstructure may be largely retained. Cold spray enables creation of coercive magnets at near full density in any desired shape.

According to various aspects of an inventive concept, an approach is described to fabricate net-shape, near full density high energy product permanent magnets. In one approach, cold spray deposition of magnetic material allows formation of complex shapes, for example, curved magnet geometries.

The deposited magnetic material as deposited by cold spray technique as described herein retains its energy density relative to the input material of the powder.

The deposited material forms a magnet having high coercivity of complex shapes. Moreover, the formation of the magnetic part using cold spray deposition methods as described herein minimizes the waste of starting magnetic material.

In one approach, deposited magnetic material using cold spray methods described herein maintains the coercivity of the starting material. In one approach, the coercivity of the deposited magnetic material may be greater than 5 kilo-Oested (kOe). A hard magnet may be defined as having a coercivity greater than 400 Oersted (0.40 kOe), as would be understood by one skilled in the art.

In one approach, the theoretical density referring to the density of the resulting part, e.g., the deposited magnetic material, may be near full density. In one approach, the energy density of the resulting part at full density and not having lost the magnetic properties during deposition may have an energy product greater than 90% of the energy product of the precursor powder. For example, and not meant to be limiting in any way, for a precursor powder having an energy product of 16 MGOe, an isotropic, non-oriented magnet material may be formed from cold spray deposition that has an energy product of about 14.5 MGOe.

Since energy density of the formed part depends on volume of the material and its magnetism and coercivity, both retained from starting magnetic material, the energy density is likely to be comparable to conventional permanent magnets.

Figure 3A:
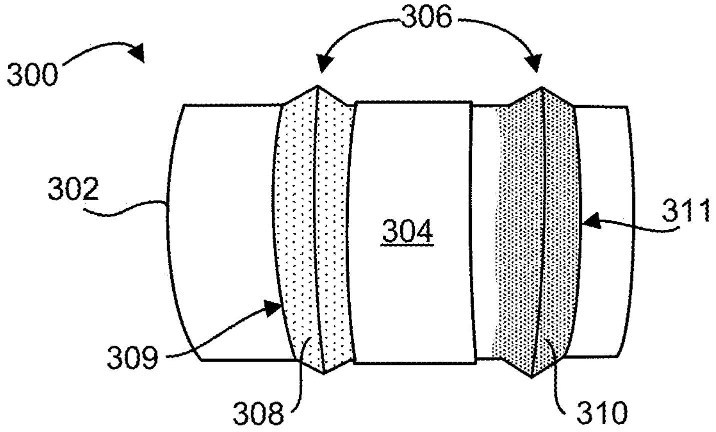
FIG. 3A is a schematic drawing of a coating on a complex shape, according to one aspect of an inventive concept.

In one approach, the material may be a conformal coating on a substrate having a complex shape, e.g., contoured, geometric, angled, etc. In one approach, as depicted in the schematic drawing of FIG. 3A, the product 300 may include material 308, 310 as a conformal coating 309, 311 on a substrate 302 having a complex shape, e.g., angled curves 306. The substrate 302 may be a cylinder with angled curves 306. Further, a separation film 304 may allow two different materials 308, 310 deposited as a coating 309, 311 on the one substrate 302 at different locations. In another approach (not shown), two different material may be deposited in the same location on the substrate.

According to one aspect of an inventive concept, precursor powders may include powders of brittle material. In some approaches brittle material may include magnetic material. For example, and not meant to be limiting in any way, precursor powders may include NdFeB based powder, NdFeB alloy powder, Samarium Cobalt-based powders (e.g., $SmCo_5$, $Sm_2Co_{17}$, etc.), Cerium Cobalt-based powders, etc. Additional metals may be included in the powder, for example, copper, mixtures of copper, zirconium, etc.

In various aspects of an inventive concept, magnetic material formed from precursor powders may include NdFeB material, NdFeB alloy material, samarium cobalt based material, cerium cobalt-based material, etc. In one approach, the magnetic material may be essentially pure magnetic material. In various approaches, the material does not include a filler material.

TABLE 1

| Common Ferroics | |
|---|---|
| Applied Field | Ferroic Type |
| Magnets | Ferromagnet |
| Electric | Ferroelectric |
| Strain | Ferroelastic |

According to various approaches, the product described herein may be include thermoelectric materials, magnetic materials, ferroic materials, multiferroic materials, composite of multiferroic materials, magnetocaloric material, ionic materials, including ionic semiconductors, etc.

In various approaches, the products described herein may include ferroics. Ferroics are classes of materials that respond strongly to external stimuli, such as an applied field. Types of ferroic material are listed in Table 1. A ferromagnet is a material that has switchable magnetism by an applied magnetic field. A ferroelectric material has switchable electric polarization by an applied electric field. A ferroelastic material has switchable deformation by applied stress. A ferrotoroidic material may also be included in which a material has switchable ordered magnetic vortices.

In addition, methods and products described herein may include magnetocaloric materials. Magnetocaloric materials is a family of magnetic materials that have a large magnetocaloric effect (MCE). An MCE is a magneto-thermodynamic phenomenon in which a temperature change is caused by changing an applied magnetic field to the material. For example, and not meant to be limiting in any way, gadolinium and some of its alloys exhibit an MCE such that the temperature of gadolinium increases in an applied magnetic field, and the temperature decreased in the absence of an applied magnetic field.

In various approaches, the product may have a composition of thermoelectric materials, magnetic materials, ferroic materials, multiferroic materials, composite of multiferroic materials, magnetocaloric materials, ionic materials, including ionic semiconductors, etc.

In one approach, the material may include at least two layers of material, where a second layer may be positioned above a first layer. In one approach, the material may be a composite of materials, where the first layer and the second layer have a different composition. In one approach, the first and the second layer may have at least one different property. For example, a first layer may be a magnetic material having a high coercivity, and a second layer may be a ferroelastic material having switchable deformation properties. In some approaches, the product is a thin film where each layer is one of a plurality of layers of the thin film.

Figure 3B:
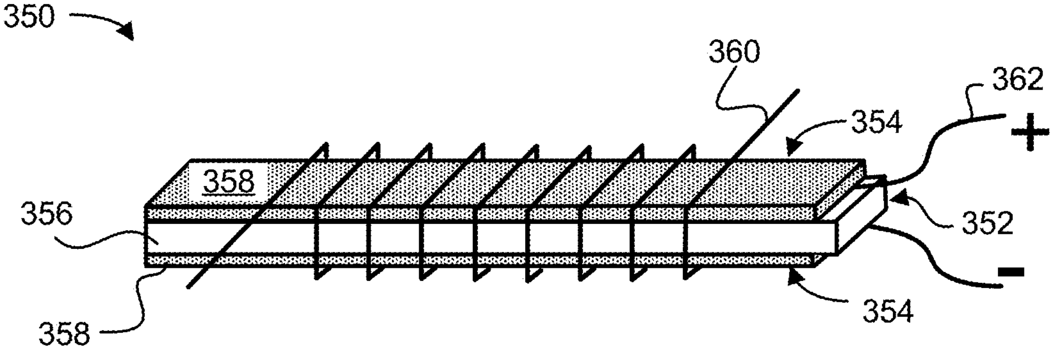
FIG. 3B is a schematic drawing of a perspective of a composite of multiferroic materials, according to one aspect of an inventive concept.

As depicted in the schematic drawing of FIG. 3B, a product 350 includes a composite of materials. A core layer 352 of a first material 356 may be sandwiched between two layers 354 of a second material 358. For example, and not meant to be limiting in any way, the product 350 may be magnetoelectric inductor with a multiferroic core. The core layer 352 may be a piezoelectric material such as lead zirconate titanate (PZT) and the layers 354 above and below the core layer 352 may include a magnetic material. Further, in one application, a working coil 360 may be added to the composite of materials such that a control voltage 362 may be applied for functional use of the product as an inductor.

In one approach, a product may include multiferroic materials. Multiferroics are a suite of materials, or material combinations, that respond strongly to multiple external fields, for example one type of multiferroic material may be simultaneously ferromagnetic and ferroelectric. Multiferroic material may be used as actuators, sensors, transducers, etc. For example, applications of ferroics may be used in areas such as switches (actuators), current sensors (sensors), energy harvesting (transducers), etc.

Further, multiferroic material include a property of converting one sort of applied field into another. An example of a multiferroic material is Terfenol-D (an alloy of the formula $Tb_xDy_{1-x}Fe_2$ (x=0.3)) is a magnetostrictive material that can expand and contract (e.g., change in size) in a magnetic field. In one instance, Terfenol-D can change in length of 0.1-0.3% when subjected to a magnetic field. This property of ferroic material may be beneficial for such applications as active sonar, fuel injectors, etc.

Moreover, another example of a multiferroic material having ferromagnetic and ferroelastic properties is $Gd_5(SiGe)_4$. The material undergoes giant length change (e.g., greater than 0.2%) when the material magnetically orders when subjected to a magnetic field.

Another example of a multiferroic material is a piezoelectric material that generates an electric charge in response to applied mechanical stress. An example of a piezoelectric material is lead zirconate titanate (PZT) which changes shape when an electric field is applied to the material, or conversely an electric field is generated when stress is applied to the material. Piezoelectric materials have applications in production and detection of sound, generation of high voltages, etc.

In some approaches, the product may include composites of multiferroics in order to enable additional features originating from each multiferroic material of the composite. An example of a combination of multiferroics is a combination of a magnetostrictive material (ferromagnetic and ferroelastic) with a piezoelectric material (ferroelastic and ferroelectric) may lead to a magnetoelectric composite (a magnetic field generates an electric field). In preferred approaches, composites include thorough mixing of the components to form fully dense parts to ensure excellent interparticle bonding.

In one approach, a composite of multiferroics including a mixture of Terfenol-D and PZT may result in a material that when a magnetic field is applied the Terfenol-D stretches in response to the magnetic field which would then cause the PZT to stretch and generate an electric field. Thus, application of a magnetic field on the combination of multiferroic material results in the generation of an electric field. According to one approach, a composite is a mixture of different multiferroic materials that would enable to apply one type of field and generate another type of behavior of the material.

In more approaches, the product may include a tunable inductor and a tunable capacitor, the capacitance may be affected by applying an electric field to one part and for the tunable inductor, the inductance could be changed by how rapidly the magnetization changes in an applied field, stretching or relaxing the magnetostriction material of the composite could generate a sizeable change of the inductance of the inductor. In one approach, the product may be used in micro-electro-mechanical systems (MEMS), a mechanical electric magnetic sensor, in a small scale, such that the application of energy results in controlling induction.

In one aspect of an inventive concept, a method using a cold spray apparatus enables a powder of brittle particles to be entrained in a supersonic gas stream and then directed out of a nozzle onto a substrate, where the powder adheres to the surface.

Figure 4:
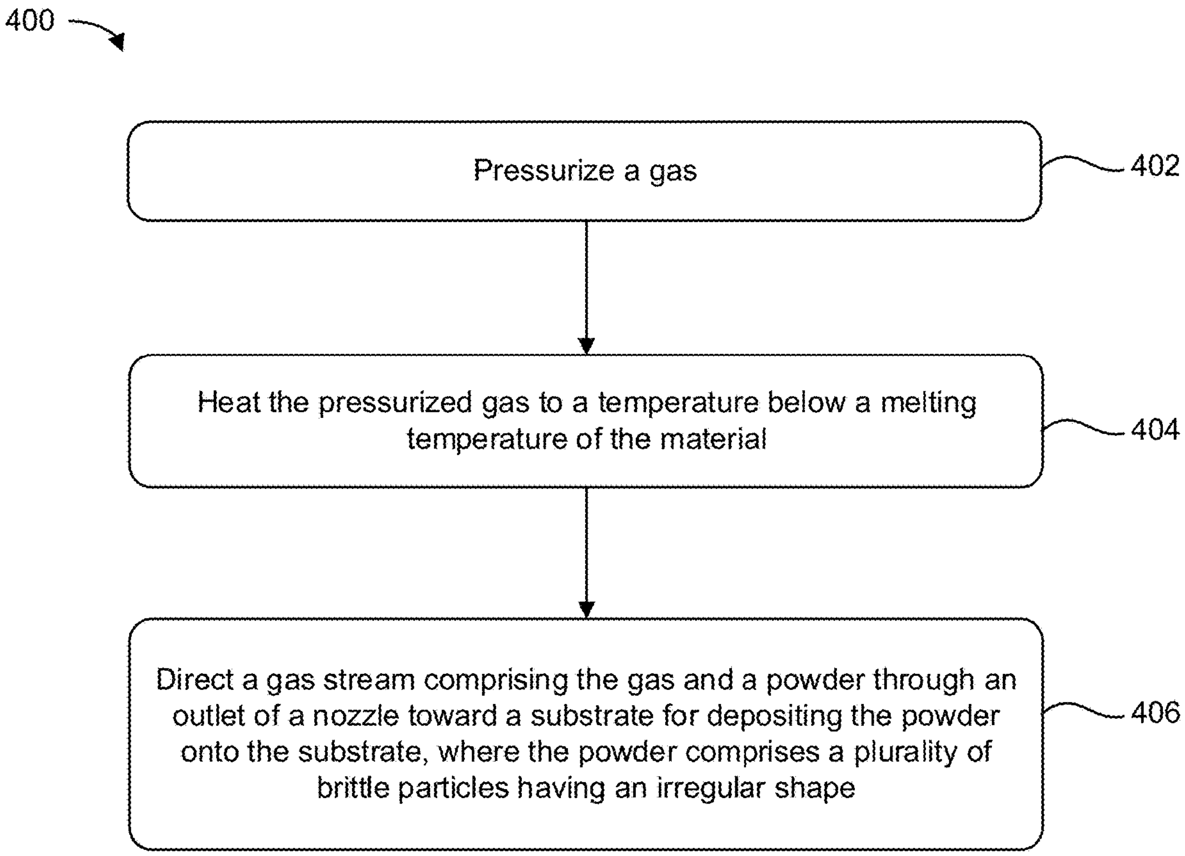
FIG. 4 is a flow chart of a method of cold spray of materials, according to one aspect of an inventive concept.

FIG. 4 shows a method 400 for forming a material using a supersonic cold spray technique, in accordance with one aspect of an inventive concept. As an option, the present method 400 may be implemented to construct structures, devices, etc. such as those shown in the other FIGS. described herein. Of course, however, this method 400 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 4 may be included in method 400, according to various aspects of an inventive concept. It should also be noted that any of the aforementioned features may be used in any of the aspects described in accordance with the various methods.

Method 400 may begin with step 402 of pressurizing a gas to a range of about 60 pound-force per square (psi) inch to about 200 psi (0.4 to 1.4 MPa) In various approaches, gases used for the supersonic gas flow include, but are not limited to nitrogen ($N_2$) gas, helium (He) gas, xenon (Xe) gas, hydrogen ($H_2$) gas, argon (Ar) gas, compressed air, and combinations thereof.

In some approaches, gases may be included to prevent oxidation by acting as a reducing agent. Exemplary examples of gases to prevent oxidation include carbon monoxide (CO), carbon dioxide ($CO_2$), ammonia ($NH_3$), etc. In other approaches, the gas may include a forming gas. For example, and not meant to be limiting in any way, a forming gas may include a non-explosive mixture of hydrogen/nitrogen.

In preferred approaches, the pressure for the cold spray process is in a range of approximately greater than 60 psi to about 200 psi (0.4 to 1.4 MPa), but may be higher or lower. In one approach, a nitrogen gas may be pressurized to 0.5 to about 0.9 MPa.

Figure 5:
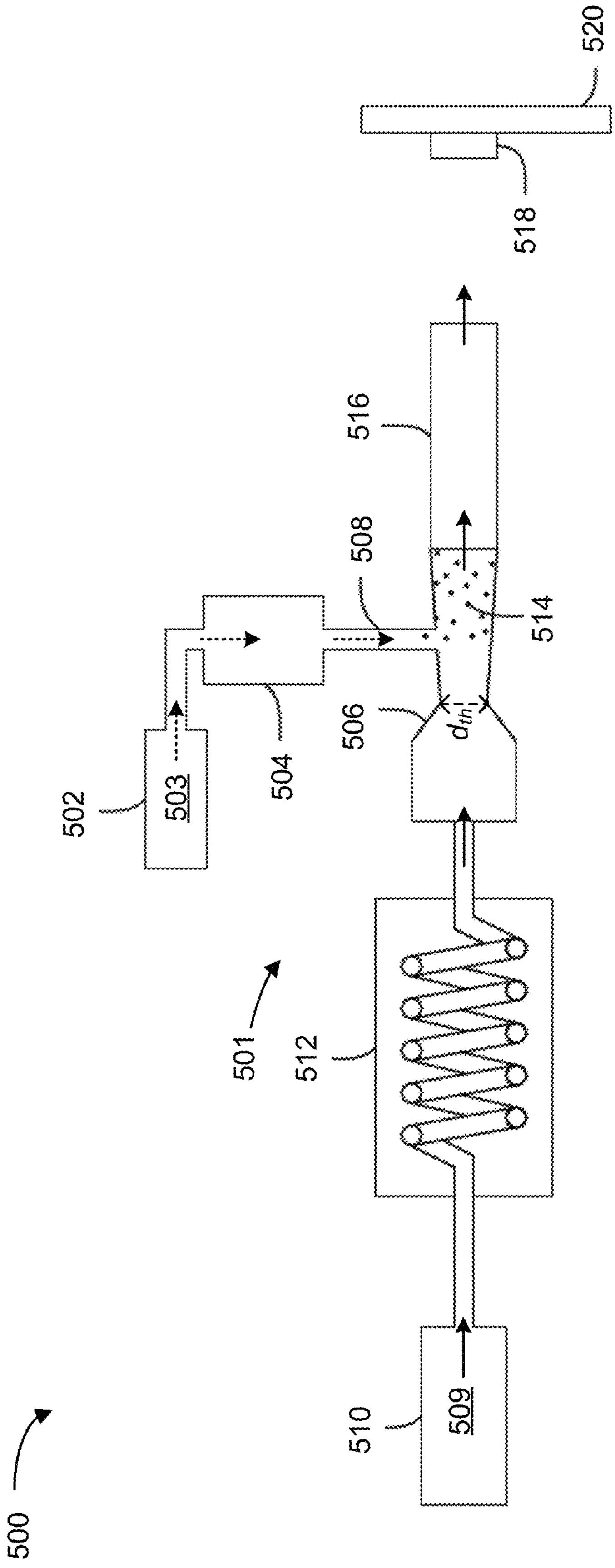
FIG. 5 is a schematic drawing of an apparatus used for a method of cold spray deposition of a material, according to one aspect of an inventive concept.

An example of an apparatus that may be used for the supersonic cold spray system is illustrated in FIG. 5. In one approach, and not meant to be limiting in any way, a supersonic cold spray system 500 includes an apparatus 501 may be used for the method 400 that describes a supersonic cold spray process herein. Step 402 of pressurizing a gas begins in chamber 510 of the apparatus 501.

Looking back to FIG. 4, step 404 includes heating the pressurized gas to a temperature below a melting temperature of the material. In preferred approaches, for magnetic materials, the pressurized gas is heated to a temperature below the Curie temperature of the magnetic material. As described herein, according to one approach, the pressurized gas temperature may not be limited to the Curie temperature of the magnetic material. The gas temperature limit may be defined by the gas temperature at the particle injection point, which for the apparatus 501, as described in FIG. 5, is significantly lower than the gas temperature entering the throat of the nozzle.

In preferred approaches, the temperature is below a temperature that may melt the particles or change the microstructure of the particles.

In preferred approaches, for magnetic materials, the pressurized gas is heated to a temperature so that the particles at their injection point are exposed to temperatures below the Curie temperature of the magnetic material. At temperatures above the Curie temperature of a material disrupts various spontaneous arrangements, magnetic ordering, etc. of the material, for example, ferromagnetism, antiferromagnetism, ferromagnetism, paramagnetism, etc.

Preferred gas temperatures at the entrance, shown in the converging-diverging nozzle 506 of FIG. 5 for the cold spray process 500, may be in a range of about 300° C. to about 500° C., but the temperature may be higher or lower. In some approaches, the temperature may be determined according to the pressure used in the cold spray process as described. In various approaches, the temperature is preferably below the melting temperature of the powder used for the cold spray process as described.

As shown in FIG. 5, the pressurized gas 509 from chamber 510 may be directed (solid arrow) into a heater 512 and heated to a desired temperature.

In one approach, the method may include directing the heated pressurized gas as a gas stream into a nozzle. As shown for apparatus 501 in FIG. 5, the gas 509 may be directed through a converging-diverging nozzle 506 with a throat diameter $d_{th}$ between about 1.0 millimeter (mm) to about 2.5 mm where the gas may be accelerated to supersonic velocity. In a preferred approach, a throat diameter of a nozzle may be about 1.5 mm. In various approaches, the throat diameter may be defined by the material and the application.

In one approach of a cold spray system 500, a low-pressure gas 503 from chamber 502, e.g., air at atmospheric pressure, may be fed (dashed arrow) into a powder feeder 504. The powder feeder 504 may include particles 514 in a particle size range of about 500 nanometers (nm) to about 50 microns (μm) in diameter. The low pressure gas 503 combines with the particles 514 and the gas 503 carries the particles 514 through a powder entrance tube 508 that may be inserted into a diverging section of the converging-diverging nozzle 506. The low pressure gas 503 combined with the particles 514 mixes with the gas 509 that has been accelerated to supersonic velocity (solid arrow).

Referring back to FIG. 4, step 406 includes directing a gas stream comprising the gas and a powder through an outlet of a nozzle toward a substrate for depositing the powder onto the substrate. In preferred approaches, the substrate is opposite the outlet of the nozzle. The deposited powder forms the material. In one approach, the powder includes a plurality of brittle particles having an irregular shape.

As illustrated in FIG. 5, the particles 514 may be accelerated with the supersonic gas flow of the gas 509 through an extension 516 of the nozzle 506, and directed toward a substrate 520, where the particles are deposited as a coating 518 upon contact with the substrate 520.

Specific nozzle throat area to exit area, convergent-divergent ratios, powder entrance tube diameters and entrance angles may be proprietary aspects of each cold spray equipment vendor's design. Despite the variation in nozzle convergent/divergent ratios, as per vendor designs, the present teachings of this disclosure are applicable to the variations. For example, a smaller nozzle throat diameter $d_{th}$ may aid in reducing the gas volumetric flow rate through the nozzle orifice, which is beneficial when spraying smaller sized particles, and an increasing divergent to convergent length ratio tends to increase the peak particle velocity at specific input gas pressure and temperature conditions, which further aids in the transport of smaller particles to the surface (e.g., as a coating 518 on a substrate 520).

In various approaches, the powder includes magnetic material and the formed material includes magnetic material. In some approaches, the powder includes ferroic material, and the formed material includes a ferroic material.

Multiferroic material tend to be brittle materials. Hence, it would be preferable to apply cold spray techniques as described herein to form structures using multiferroic material. In various approaches, a multiferroic material includes the following: a ferromagnet material, a ferroelastic material, a ferroelectric material, and a ferrotoroidic material.

In some approaches, cold spraying brittle semiconductor materials demonstrate the following challenges: 1) getting particles that are less than several microns (μm) in size to gain enough kinetic energy to impact the surface and stick, and 2) moving cohesive, and thus, flow resistant particles into the gas stream. The precursor powder may be defined as cohesive, and thus may be described as flow resistant due to the cohesive behavior of the powder particles.

In cold spray processes with crystalline material powders, the cohesiveness of crystalline material powders with very small particle sizes can be challenging. In some approaches, particles having an average diameter of less than 2-3 μm, in a nanometer range, may be beneficial to the deposition of the particles and the final properties of the material being deposited by the cold spray process.

In some approaches of cold spray methods using metal material, metal particles of a powder demonstrate a plastic deformation characteristic upon depositing on the substrate by the cold spray techniques. The particles tend to mold together upon impact on the substrate. In some approaches of cold spray deposition with brittle materials, without wishing to be bound by any theory, a deformation process may occur during deposition of particles of brittle materials on previously deposited particles. In some approaches of cold spray deposition of particles of brittle material, a deformation process may occur between the depositing particle and the substrate.

The mechanical behavior of the various sized brittle particles when they impact the surface and when they are impacted by subsequent particles is not fully understood. Without wishing to be bound by any theory, it is surmised that the brittle particles making impact on the substrate or already deposited layers of particles undergo a structural change that results in the formation of a material being a solid. In one approach, the deposition of a brittle particles may undergo a deformation process similar to the schematic drawing in FIG. 2B. In another approach, the brittle particles upon deposition undergo a packing process with the substrate and particles that have already been deposited, as illustrated in the schematic drawing of FIG. 2C. The supersonic impact of the particles onto the substrate may cause an adhesion of the particles to the substrate as well as the continued adhesion and buildup of new deposited particles to the previously deposited material. The resulting material is a solid. In some approaches, the malleability of the particles may define the initial and continued deposition onto the substrate during the cold spray process.

In some approaches, the powder of the material includes a plurality of particles, where an average diameter of each of the plurality of particles is in a range of about 500 nm to about 50 μm, and may be higher or lower. In preferred approaches, the powder used in the cold spray process, as described herein, has a particle size distribution of particles having an average diameter in a range of 800 nm to about 2 μm. Moreover, the shape of the particles used in the cold spray process may have a shard-like, brittle, angular, etc. geometry (as shown in image of FIG. 9A, below).

Figure 6:
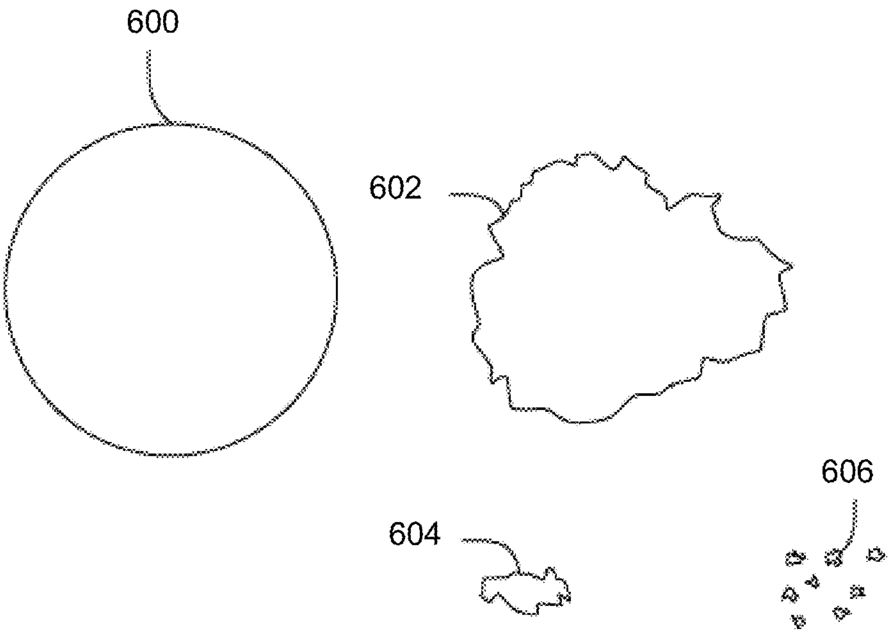
FIG. 6 is a schematic drawing of different sizes of particles used in the cold spray deposition process, according to some aspects of an inventive concept.

FIG. 6 illustrates a comparison of the particle shape and sizes of a powder to be used in a supersonic cold spray process, according to one aspect of an inventive concept. In one approach, a typical spherically shaped particle 600 having a diameter in a range from about 25 to about 75 μm in size may be included in the powder. In one approach, particles 602 of crystalline materials may have a diameter in the range of about 25 to about 75 μm and may vary widely in shape and size in all three dimensions. In some approaches, the particles 600 and 602 may be reduced in size by methods such as ball milling, grinding, gas atomization, flame spray pyrolysis, chemical synthesis, etc. In one approach, particles may be formed by Hydrogenation Disproportionation Desorption Recombination (HDDR). In some approaches, particles may be formed from a series of approaches listed above, but not in any way limited to only these approaches.

In various approaches, particles generated by grinding, milling, etc. large polycrystalline billets of material may not generally be spherical or regular in shape (i.e. highly irregular in shape), with significant variations in the size of all three dimensions and shape irregularities in each dimension. During a size reduction process, the brittle nature of the material may produce shard-like, micron-sized particles 604. In some approaches, the sizes of the particles 604 may have a largest dimension of three dimensions (height, width, depth) having an average measurement in a range of about 500 nm to about 50 μm. In some approaches, the sizes of the particles 604 may have a largest dimension having an average measurement in a range of about 1 μm to about 10 μm. In some approaches, the sizes of the particles 604 may include each of the plurality of particles having a largest dimension having an average measurement in a range of about 1 μm to about 5 μm. In some approaches, a size reduction process may also produce extremely small particles 606 in which the major and minor dimensions may be nanometer (nm) in size, e.g., greater than 0 and less than 1 μm.

In preferred approaches of cold spray deposition, micron-sized particles 604 tend to adhere preferentially to the substrate at supersonic velocity compared to larger particles 600, 602. In some approaches, larger particles 602 having a diameter in a range of about 25 μm to about 75 μm may fracture and bounce off the substrate surface when the particles impact the surface, essentially sandblasting the surface.

Figure 9A:
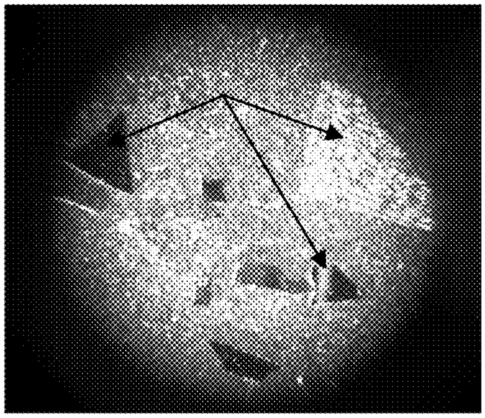
FIG. 9A is a photographic image of NdFeB crushed powder, according to one aspect of an inventive concept.
Figure 9B:
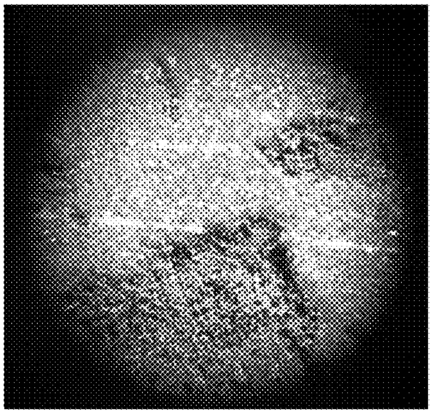
FIG. 9B is a photographic image of NdFeB crushed ribbon powder after HEBM cycle, plus sieved through 400 mesh sieve, according to one aspect of an inventive concept.
Figure 9C:
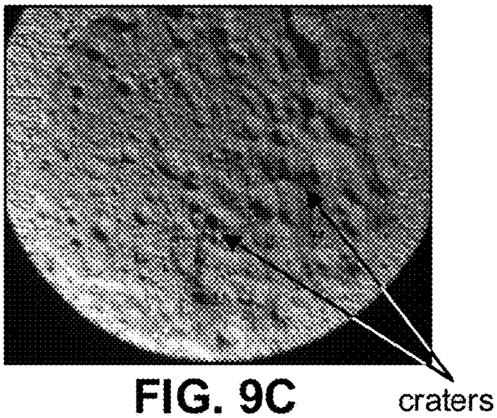
FIG. 9C is a photographic image of NdFeB crushed ribbon powder with a 1 HEBM cycle then sieved through a 400 mesh sieve, according to one aspect of an inventive concept.

In one approach, cold spray deposition of particles of brittle materials may create craters, fractures in any brittle material that has previously deposited as shown in FIG. 9C. In one approach, the particles from brittle material may form craters in the surface of the deposited material. In some approaches, particles having an average diameter (e.g., size) in a range from about 25 μm to about 75 μm may create craters, fractures, etc. Subsequent impacts from particles of this size range may eventually scrub away any buildup of brittle material that may have previously been deposited.

In preferred approaches, particle sizes and size ranges within the material powders include nanometer scale to low micron scale (less than 50 μm). Moreover, an irregularity in the individual particle shapes may be critical for the deposition.

In some approaches, particles having a very low mass, e.g., in the nanometer to low μm size range, may not gain sufficient kinetic energy to traverse the bow shock of the expanding gas stream and reach the surface. In various approaches, the cohesive and adhesive nature, electrostatic charge, hygroscopicity and non-Newtonian flow characteristics of powders including small, non-spherical, crystalline particles may affect the uniform flow of the powder into the gas stream. In some approaches, the grain size and the orientation of the crystalline structure in the final deposited material are critical for determining property characteristics of the deposited material.

In one approach, a binding agent may be included with the particles for enabling the deposition and buildup of the brittle magnet material on a substrate.

In some approaches, the precursor powder may include an additive to aid in the flowing of the particles of the precursor powder. In one approach, the additive may include a binder material. In one approach, the additive may include non-metallic additives as binders. In one approach, the additive may include hollow glass microspheres. In one approach, including hollow glass microspheres may allow adherence of some of the smaller micron sized and nanometer sized particles to the hollow glass microsphere. In one approach, the round form of the hollow glass microsphere may decrease the resistance-to-flow of the particle mix.

In one approach, the additive may include a polymer such as but not limited to high molecular weight silicone resins. In one approach, a polymer may aid in binding of the particles to the substrate, act as a protective component (e.g., layer) against oxidation, etc.

In various approaches, a concentration of the additive in the precursor powder may be at an effective concentration for aiding the particles of the precursor powder to flow in the cold spray apparatus and deposit efficiently on the substrate.

In some approaches, the additive may be present in the product of the substrate and material of deposited particles from the precursor powder. In one approach, the additive may be present in a concentration of less than 25 wt % of the formed material from the cold spray process. In one approach, the additive may be present in a concentration of less than 20 wt % of the formed material from the cold spray process. the additive may be present in a concentration of less than 15 wt % of the formed material from the cold spray process. In one approach the additive may be present in a concentration of less than 10 wt %, 5 wt %, 1 wt %, 0.5 wt % of the formed material from the cold spray process.

In various approaches, the additive may be removed chemically, thermally, etc. from the formed material. In one approach, concentration of additive may be less than 0.1 wt % of the formed material. In one approach, the formed material is substantially free of additive.

The performance of magnetic material, ferroics, multiferroics, and other materials described herein critically depends on maintaining the microstructure of the starting powder material, the crystalline atomic structure, the elemental composition, etc. The microstructure, atomic structure, composition characteristics, etc. may be negatively compromised if the material is subjected to temperatures, conditions, etc. sufficient to melt the material, change its phase, alter its composition, etc.

Without wishing to be bound by any theory, it seemed the larger particles (about 2 μm) in the powder mixture acted as a hammer to increase the density of the deposited material (e.g., to densify the deposited material). In preferred approaches, a small percentage of particles have a diameter in a range of about 10 to 15 μm to generate buildup of deposited material. In some approaches, the buildup may be uniform across the spray area.

In one approach, the material may be essentially pure magnetic material. In various approaches, the powder of material does not include a filler material.

In some approaches, the process as described herein solves a problem of forming magnets using an inherently inefficient subtractive manufacturing process, where waste of starting material can exceed 90%.

The substrate onto which the cold spray powder is deposited may a hard material, e.g., glass, quartz, etc. It was surprising to the inventors that brittle powder of the cold spray process described herein was successfully deposited on a hard substrate such as quartz and glass.

In some approaches, the substrate may be a metallic material, e.g., copper. The substrate may be a soft material, e.g., aluminum silicate.

For a magnetic material, subjecting the material to temperatures above the Curie temperature of the material changes the magnetism of the material. If high temperature techniques such as sintering for formation of magnets are used, the particles melt and thus subsequent deleterious changes to the microstructure, crystalline structure and/or the elemental composition may likely significantly reduce or even eliminate the desirable magnetic properties of permanent magnets.

Figure 7:
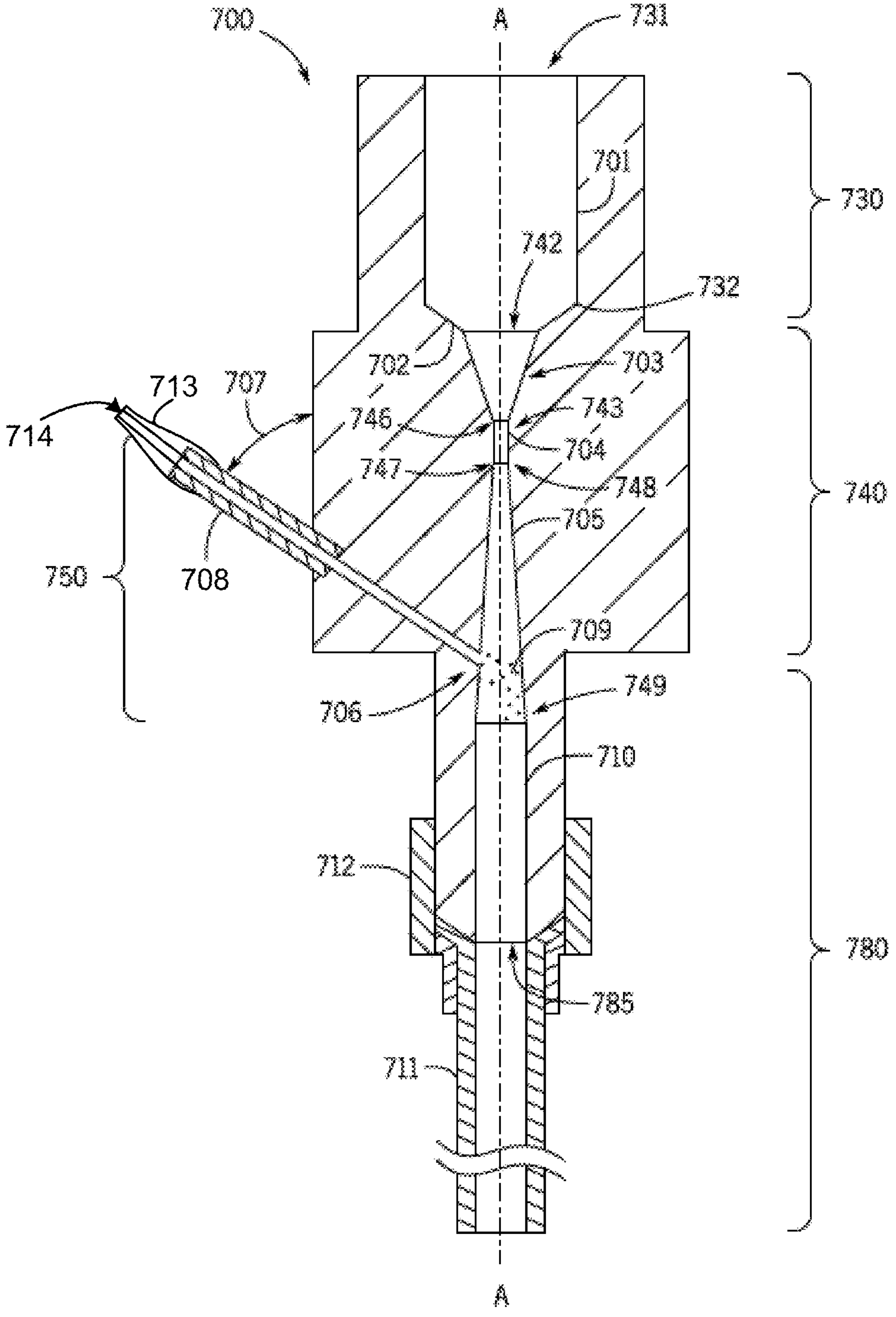
FIG. 7 is a schematic drawing of a cold spray nozzle used in the cold spray deposition process, according to one aspect of an inventive concept.

In one approach, a nozzle of the cold spray system may be described as illustrated in th schematic drawing of a cross-section of a nozzle 700 in FIG. 7 (similar to the nozzle 506 of FIG. 5). In some approaches, the nozzle 700 may result in a successful deposition of materials as described herein. While this supersonic cold spray nozzle design has similarities to nozzles in conventional cold-spray deposition techniques, there are several unique differences that contribute to the ability to cold spray near theoretical density materials as described herein. A cross section of a modified machined brass de Laval type convergent-divergent nozzle assembly includes a gas feeder section 730, a convergent-divergent section 740, a powder entry section 750, the brass tube 708, and an exit section 780.

The gas feeder section 730 includes a first uniform area 701 having a top side 731 and an opposing side 732 being 11 millimeters (mm) in internal diameter and 4.1 centimeters (cm) in length and a first sharply tapered area 702. The first sharply tapered area 702 extends from the opposing side 732 of the first uniform area 701 and then being sharply tapered at an angle of 60 degrees (60°) from a center axis of the convergent-divergent nozzle assembly 700 to a 5 mm diameter where it transitions into a top side of the convergent portion 703 of the convergent-divergent section 740.

The convergent-divergent section 740 includes a convergent portion 703, a throat section, 704, and a divergent section 705. The convergent portion 703 includes a top side 742, an opposing side 743. The top side 742 of the convergent portion 703 is immediately tapered at a total angle of 22° for 9 mm to the opposing side 743 of the convergent portion 703. The opposing side 743 transitions to a top portion 746 of the throat section 704. The throat section 704 being 1.5 mm in diameter and extending to 3 mm in length to an opposing side 747 of the throat section 704 transitions to a top side 748 of the divergent section 705. The divergent section 705 is machined at a total cone angle of 12° from the center axis for 18.3 mm in length to an opposing side 749 to achieve a throat area to exit area ratio of 10.

The powder entry section 750 includes a powder entry hole 706 and a brass inlet tube 708. The powder entry hole 706 being 1.5 mm in diameter intersects the divergent section 705 of the nozzle at angle of 57° 707 from the central axis and 14.3 mm from the opposing side 747 of the throat section 704. The brass inlet tube 708 being of an internal diameter of 1.5 mm and being of an external diameter of 3 mm. A powder feed system 714 attaches to the de Laval type convergent-divergent nozzle assembly 700 by inserting the silicone rubber tube 713 onto the brass inlet tube 708.

The exit section 780 includes a constant 5 mm internal diameter section being 1.4 cm in length 710, a stainless-steel extension tube 711, and an AN4 type compression fitting 712. The constant 5 mm internal diameter section being 1.4 cm in length 710 extends from the opposing side 749 of the divergent section 705 to a top side 785 of the stainless-steel extension tube 711. The stainless-steel extension tube 711 being of an ¼ inch external diameter and being of an internal diameter of 5 mm and being a nominal length of 10.5 cm. The AN4 type compression fitting 712 attaches and detaches the stainless-steel extension tube to the modified machined brass de Laval type convergent-divergent nozzle 700 assembly.

In one approach using the nozzle 700 assembly, nitrogen gas at a nominal pressure of (e.g., 0.7 MPa) and a temperature of 500° C. enters the modified machined brass de Laval type convergent-divergent nozzle assembly 700 at the top side 731 of the first uniform area 701 of the gas feeder section 730. The particles for depositing are drawn into the powder entry section 750 from the silicone rubber tube 713 into the brass inlet tube 708 as suction is created at the powder entry hole 706. The moderate pressure, high temperature gas in the gas feeder section 730 rapidly expands and cools in the divergent section 705 of the convergent-divergent section 740 of the modified machined brass de Laval type convergent-divergent nozzle 700 assembly. This gas flow creates suction at the powder entry hole 706 which pulls the 709 thermoelectric semiconductor powder particles from the brass inlet tube 708 into the supersonic gas stream. The gas and rapidly accelerating entrained particles then continue through the exit section 780, first entering the constant 5 mm diameter section of the length 710 and then enter the stainless-steel extension tube 711 prior to being deposited onto a substrate material.

Aspects of this supersonic cold spray nozzle design which aid in the deposition of near theoretical density of materials with particle sizes in the 0.1 μm to 10 μm range include the throat section being 1.5 mm in diameter, the convergence/divergence length ratio of 1 to 3, a nozzle expansion area ratio of 10, the divergent section total cone angle of 12° from the center axis, the powder entry hole being 1.5 mm in diameter, intersecting the divergent section of the nozzle at an angle of 57° from the central axis, and being 14.3 mm from the opposing side of the throat section.

In some aspects of an inventive concept, the thickness of the cold spray deposited powder may be in a range of about 10 μm or 20 μm to more than a centimeter. In some approaches, the limits of the thickness of the spray deposit may depend on the desired application. In various approaches, the process may build up any desired thickness by constantly moving the nozzle extension away from the spray surface at the deposition rate. In one approach, the desired material may have a thin layer of cold spray deposits. In another approach, the desired material may have a thick layer of cold spray deposits. In some approaches, with particular powders, a thinner deposit having a thickness of less than 10 microns may resemble an overspray by-product and be easily removed.

In some approaches, up to 95% of starting material as powder fed into the cold spray apparatus may be deposited on the substrate. In some approaches, the as-deposited material may be greater than 95% dense where the as-deposited material represents about 30% of the sprayed material, the other 70% of sprayed material is typically overspray that deflects around the chamber. In preferred approaches, the overspray material may be recovered and re-used for additional cold spray processes.

In one approach, the cold spray deposition method as described herein allows additively forming the shape directly, without cutting, grinding, sanding, etc. into a desired shape. The desired material in the form of a powder is supersonically added onto a surface. In various approaches, the powder that does not adhere together onto the surface may be collected and reused, and thus, material loss during manufacture may be minimized. In sharp contrast, in conventional methods of manufacturing magnets, the material lost to cutting, grinding, etc. cannot be recovered. Moreover, the material recovered (overspray, non-adhered powder, etc.) is the same powder as the starting material.

In various approaches, the additive approach of cold spray deposition, where layers of particles are adhered to a substrate surface, allows formation of complex shapes de novo. In one approach, the cold spray deposition process allows deposition of powder onto a substrate having a complex surface, e.g., angles, curves, geometric shape, edges, etc.

In various approaches, density of the deposited material may be a measure of the fraction of voids present in the deposited material. In one approach, the density of the deposited material near essentially fully dense. In preferred approaches, a high density magnet formed from deposited material generates a higher energy density since energy density of a magnet is relative to a fraction of the volume of the magnet. The substrate may be of any shape, including having a curved shape, tight angles, an interior of a box, an interior of a cylinder, etc.

A further operation may include sintering the cold spray-deposited powder to improve the mechanical strength of the product.

In one approach, a step of the cold spray process of brittle materials may include post densification of the deposited material. In one approach, densification of thin film materials may include laser peening of the deposited layer. In one approach, a step may include densification of thin film thermoelectric materials.

In addition, a protective coating may be applied to the cold spray-deposited powder. In one approach, a coating may protect against oxide formation. In some approaches, the protective coating may act as an oxidative barrier. Preferred materials for a protective coating include a polymer, nickel, nitrocellulose dissolved in acetate, etc.

This technique enables production of magnets with user definable shapes, including magnets from sub-millimeter thicknesses to arbitrary sizes without destroying the microstructure.

According to one aspect of an inventive concept, multiferroic material may be used in direct cold spray techniques. Brittle multiferroic materials, such as Terfenol-D may be sprayed directly onto a surface to create a bulk structure. In some approaches, a bulk structure may be a structure of a size greater than a few particles (e.g., greater than 2 particles, 3 particles, 4 particles, 5 particles, etc.). In one approach, the bulk structure may be large enough to be visible to the human eye. In some approaches, the bulk structure may be a coating, thin film, etc.

In various approaches, the cold spray process as described herein may allow preferential orientations of the material. For example, the material may be anisotropic such that the orientation of the particles of the material may not be oriented along the same direction, i.e., some particles may be oriented in the z direction while other particles may be oriented in the x-y direction. In some approaches, upon application of a magnetic field, the material may include particles with their easy axis aligned with the applied magnetic field, thereby resulting in preferential orientations of the particles of the material. In approaches where the relative strength of the applied field and the particle coercivity is correct, the easy axis of the particles aligns with the external field due to magnetic torque. In some approaches, the cold spray technique as described may be performed under a magnetic field. In other approaches, a magnetic field may be applied after depositing material on a substrate by the cold spray techniques described herein.

Figure 8A:
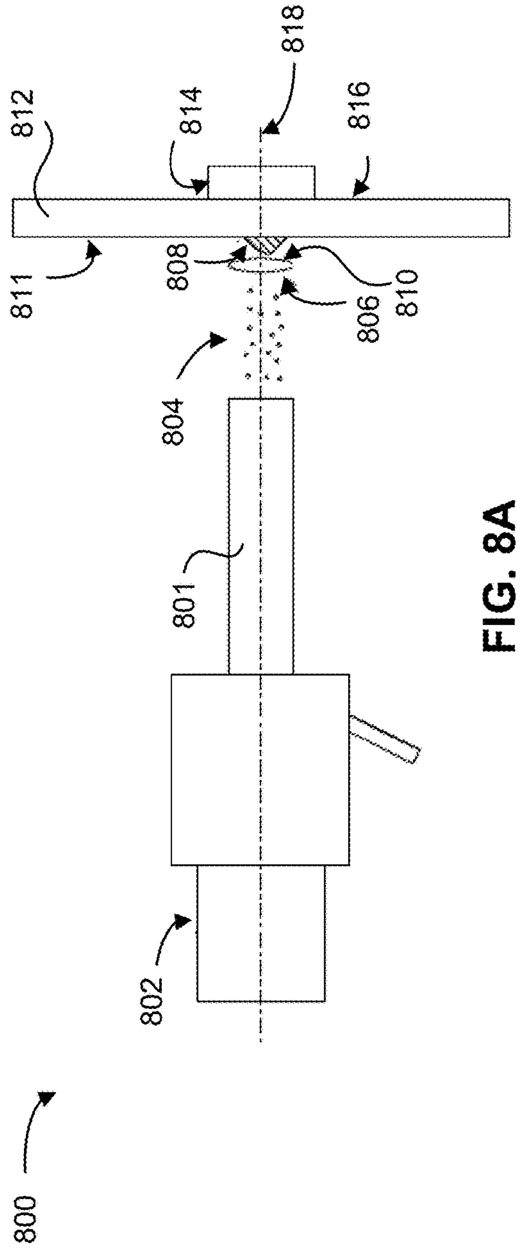
FIG. 8A is a schematic drawing of an apparatus using a high performance magnet to align cold sprayed particles, according to one aspect of an inventive concept.
Figure 8B:
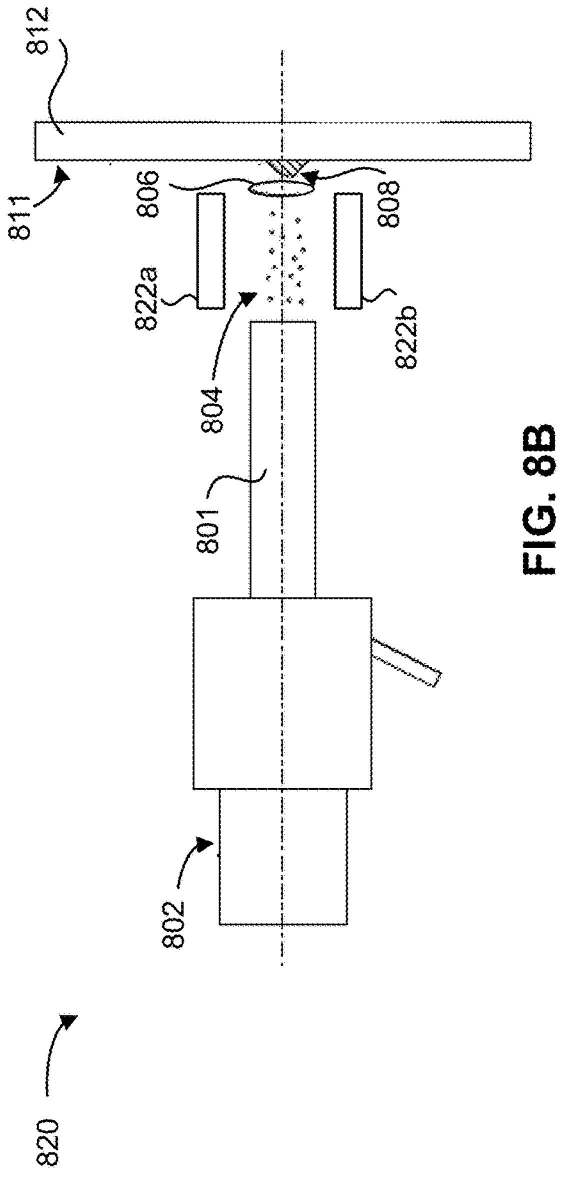
FIG. 8B is a schematic drawing of an apparatus using an electromagnetic field to align cold sprayed particles, according to one aspect of an inventive concept.

In one approach, FIGS. 8A-8B illustrate using high performance magnets to preferentially align the particles during the cold spray process. Particles of the powders described herein traveling at supersonic velocity may be influenced by strong magnetic fields.

The cold spray system 800 of FIG. 8A illustrates aligning the particles with a magnet 814 positioned behind the substrate 812. A cold spray nozzle 802 with nozzle extension tube 801 may be placed above the deposition surface 811 of the substrate 812. Particles 804 that have been drawn into the gas stream exit the cold spray nozzle 802 with nozzle extension tube 801 traveling at supersonic velocity. Approximately a nominal distance above the deposition surface 811 of the substrate 812 there is a bow shock 806. As the particles 804 that have been drawn into the gas stream pass through the bow shock 806, they exit into a region 810 in which the gas velocity is subsonic. When smaller, 1 μm or less, particles 804 encounter the bow shock 806 they may be quickly decelerated and then swept away by the gas stream without adhering to the deposition surface 811 of the substrate 812. Alternatively, the particles 804 may adhere to previously deposited material 808 on the deposition surface 811 of the substrate 812.

In one approach, the magnet behind the spray surface extends in an x-y plane normal to the spray stream beyond contact area of the spray stream on the spray surface. In one approach, the magnet behind the spray surface has an area in the x-y plane normal to the spray stream of at least 90% of the spray area of the spray surface. In preferred approaches, the magnet behind the spray surface has dimensions in a range of greater than 95% of the spray area.

In one approach, the method may include cold spraying under the influence of an external magnetic field by placing at least one large strong magnet behind the spray surface. In one approach, dimensions of a large strong magnet may be dimensions greater than twice the diameter of spray area. For example, and not meant to be limiting in any way, a magnet having approximate dimensions of 2 to 3 $cm^2$ may be placed behind a spray surface where the spray area is approximately 1 $cm^2$. In some approaches, the magnet may have dimensions in a range of greater than 0.5 $cm^2$ to less than 5 $cm^2$.

In one approach, the cold spray method may include applying a magnetic field to the particles in the gas stream for orientation of the magnetism for a preferred alignment. In one approach, preferential orientations and texturing may be encouraged by spraying under the influence of an external field by placing a pair of ferromagnets separated so that the particle stream passes between them with the particle flux normal to the magnetic field.

In one approach, the cold spray system 820 of FIG. 8B illustrates aligning the particles with a magnets 822*a*, 822*b* positioned adjacent to the gas stream of particles 804 exiting the nozzle extension tube 801 of the cold spray nozzle 802 before the particles 804 reach the deposition surface 811 of the substrate 812. The magnets 822*a*, 822*b* may be positioned in parallel with the bow shock 806, alongside the bow shock 806, above the bow shock 806, etc. In one approach, as illustrated in FIG. 8B, a pair of magnets 822*a*, 822*b* (e.g., ferromagnets) may be positioned opposite one another, e.g., at the top and bottom with the spray stream there between, at opposite sides of the spray stream with the spray stream therebetween, etc.

Placement of a high performance magnet 814, 822*a*, 822*b* (e.g., a neodymium type magnet) with a field strength in the range from about 0.2 to 2 Tesla. In one approach, the magnet may have a strong magnetic property. In various approaches, an exemplary strength of the large magnet provides a field greater than 0.5 tesla (T).

In one approach, as illustrated in FIG. 8A, the magnet 814 may be placed directly beneath an opposing side 816 of the deposition surface 811 of the substrate 812 may preferentially align the particles in the deposited material 808. In addition, the magnetic field may aid in the smaller powder material particle reaching the surface with sufficient energy to adhere to the deposition surface 811 of the substrate 812 and/or the previously deposited material 808. In another approach, as illustrated in FIG. 8B, the magnets 822*a*, 822*b* may be placed adjacent to the gas stream of particles 804 before deposition onto the deposition surface 811 of the substrate 812.

The magnet(s) 814, 822*a*, 822*b* may include discrete magnetics (e.g., ceramic, rare earth magnets, etc.), an energized field coil, etc. In various approaches, magnetic fields may be generated by permanent magnets, electromagnets, solenoid, etc. In some approaches, characteristics (size, magnetic strength, etc.) of the different types of magnets capable of generating the desired magnetic field may be similar. In some approaches, characteristics of the different types of magnets capable of generating the desired magnetic field may be different. In some approaches, characteristics of the magnets generating the magnetic field may depend on the cold spray process as described herein.

In one approach, as illustrated in FIG. 8A, the central axis 818 of the North and South poles of the magnet may be oriented co-linear with the axis of the cold-spray nozzle 802 with nozzle extension tube 801.

Furthermore, preferential orientation of the material may result in texturing of the material. Texturing may be defined as preferential alignment of the particles of the material. The particles may not initially be aligned upon deposition (e.g., the particles may be randomly aligned), and then following alignment by an applied field, the particles may be aligned in a direction that is visible, detectable, apparent, etc. thereby resulting in a texture of the material.

In one approach, the fields (e.g., electric, magnetic, stress, etc.) may be applied simultaneously during deposition of the material by cold spraying. In one approach the fields (e.g., electric, magnetic, stress, etc.) may be applied after deposition of the material on the target surface.

In yet another approach, the external field may be a combination of a large strong magnet behind the spray surface and placing a pair of ferromagnets on either side of the particle stream. In various approaches, multiple field lines may be applied according to the placement of the magnets generating the at least one magnetic field during and/or after cold spraying of the multiferroic material.

In one approach, the external field may be a static magnetic fields. In another approach, the external field may be a pulsed field. For example, the sample may be magnetized in place thereby allowing higher magnetizations to be obtained. In one approach, the applied fields might vary in time, e.g., a short timescale for pulsing, a longer timescale for creating a variable magnetization texture over a region of the sample, etc.

An advantage of applying a pulsed field may allow achieving larger magnetic fields for a short time since the coils of an electromagnet may not be energized long enough to need significant cooling apparatus. In one approach, the applied fields may be synchronized during deposition of the particles, for example, in an application where the particles are not sprayed continuously.

Similarly, in another approach, the external field may be a variable field for spatially varying magnetization in the product formed by cold spray methods described herein. For example, and not meant to be limiting in anyway, applying a variable field at different points during deposition may result in forming a Halbach array, as would be generally understood by one skilled in the art.

In one approach, time-varying magnetic fields may be applied to both the particles in the gas stream and particles already deposited in the sample.

In one aspect of an inventive concept, the process of direct cold spray of multiferroics may be extended to other brittle multiferroics such as piezoelectrics (e.g., PZT). In such cases, an electric field may improve texturing along the lines described for the magnetic fields.

According to another one aspect of an inventive concept, composite multiferroics may be used in cold spray techniques. In one approach, cold spray of composite multiferroics may be obtained by producing a homogenized mixture of multiple species from a single nozzle. In another approach, cold spray of composite multiferroics may be obtained by two nozzles synchronously depositing particles.

In yet another approach, cold spray of composite multiferroics may be obtained by sequential spraying, where a thin layer of the first species is deposited, followed by a layer of the second species, and repeated with alternating layers until the desired thickness is obtained. In one approach, cold spraying of layers may generate a concentration gradient of a multiferroic material. In one approach, a defined pattern may be generated during cold spraying of at least two multiferroic materials. In various approaches, an approach of cold spraying multiferroic material may be determined by the multiferroic material components and their properties. These approaches are by way of example only and are not meant to be limiting in any way.

In one approach, a method of cold spray deposition may form a composite material. In one approach, a substrate for deposition may include a thin film having a first multiferroic material, where a second multiferroic material may be deposited onto the thin film having the first multiferroic material.

In one approach, the method of cold spray deposition allows the formation of thin layers, where the thickness of each layer may be at least the diameter of the average particle being deposited. In one approach, the method of cold spray deposition may include depositing a second powder onto the substrate, where the powder and the second powder have a different composition. In one approach the powder and the second powder may have at least one different property.

In one approach, particles of a powder may be deposited onto a thin foil of a second material, e.g., multiferroic, ferroic, etc. The particles may be supersonically deposited to embed in the foil at least 10% of the particle. For example, a thin foil layer on the substrate may have a thickness of 10 μm, and then the cold spray deposited particles of a second material, in which the particles have an average diameter of 10 μm, may imbed onto the thin foil thereby creating a closely intermixed foil of foil material and particles of a second material.

In one approach, a composite of different multiferroic material may be formed. In one approach, a sandwich of multiferroic material may include a layer of type 1 multiferroic, a layer of type 2 multiferroic material, and another layer of type 1 multiferroic material (see FIG. 2). For example, and not meant to be limiting in any way, a Terfenol-D, a magnetostriction material may be combined with a layer of PZT, a ferroelastic material. The PZT layer provides the effect of when an electric field is applied the PZT layer expands or contracts, and the Terfenol-D layer provides the effect of when a magnetic field is applied, the Terfenol-D layer lengthens or contracts, so then a composite of PZT and Terfenol-D combines the effects of the electric field and magnetic field such that applying an electric field could change the magnetic field.

In one aspect of an inventive concept of a cold spray method forming a composite material may include an apparatus having a second nozzle for depositing the second powder onto the substrate, where the first powder and the second powder are deposited simultaneously onto the substrate.

Good performance from composite multiferroic material structure may result from uniform mixing at a very fine length scale. Preferably, the particles are mixed at the size of the particles, and preferably substantially no clumping, chunks in sizes greater than the individual particles, etc. In addition, good performance from the composite multiferroic structure may result from strong interparticle coupling in which adjacent particles, each particle from a different multiferroic material, are aligned such that they have complementary responses to the applied field. For example, for a composite of Terfenol-D and PZT, when a Terfenol-D particle stretches in response to an applied magnetic field, an adjacent PZT particle stretches as well and generates an electric charge. In some approaches, the coupling between particles may be in the z-direction, x-y direction, between adjacent layers of different multiferroic materials, etc.

Poling with applied fields as described above would be expected. For example, poling may be caused by applying an electric field to the composite of multiferroic material.

In yet another one aspect of an inventive concept, a method may include cold spray of multiferroic particles onto a ferroic or multiferroic foil. Cold spray on a multiferroic foil may allow the sprayed particles to embed themselves into the underlying foil. In one approach, a foil of a first multiferroic material may be on a surface and a second multiferroic material may be cold sprayed onto the foil so that the second multiferroic material is embedded into the foil of first multiferroic material. For example, particles of a second multiferroic material having an average diameter of 10 to 50 microns (μm) may be embedded into a foil of a first multiferroic material.

In some approaches, these mixed layers may be useful directly in microelectronic applications, particularly for magnetoelectric materials where they may serve as filters (e.g., band-pass), resonators (e.g., cavity), circulators, phase shifters, etc. Alternatively, the mixed layers may be stacked to form bulk structures.

EXPERIMENTS

Cold Spray Testing of NdFeB Crushed Ribbon Powder

A powder was received that included large metallic-like shards (arrows) as shown in FIG. 9A, approximately 50 to 400 μm. Two twenty gram batches of NdFeB powder with 6 ml alcohol were High Energy Ball Milled (HEBM). The powder mixture was milled for 3 hrs. then dried at 60° C. for 12 hrs and sieved through a 400 mesh sieve.

FIG. 9B is an image of NdFeB crushed ribbon powder after HEBM cycle, plus sieved through 400 mesh sieve. The sieved powder consisted of particles less than 37 μm that agglomerated together.

Several cold spray trials were run at 500° C. and 100 psi. Trials one and two consisted of ~0.2 grams of powder. Sample one was done on sanded copper, and sample two was done on etched glass. The copper showed an initial deposition, the etched glass much less.

The feed rate of the 400-mesh powder was carefully tuned. If the feed rate was slow, a lot of air was drawn into the feed tube and the deposition was low. If the feed rate was too high, and the powder agglomerated, then the inlet tube clogged at the nozzle entrance.

Figure 9D:
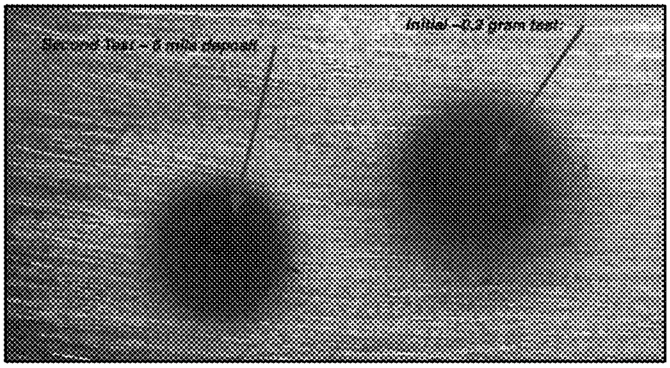
FIG. 9D is a photographic image of deposition of powder, according to one aspect of an inventive concept.

In one example, 5 grams of powder was used with a quick feed. The image of FIG. 9C shows the surface texture of a deposited layer of about six mils. The surface texture suggested that larger particles were cratering the material that was deposited. As shown with black arrows, craters may be formed by impact of magnetic material particles having an average diameter greater than 20 to 25 μm. The image of FIG. 9D represents two depositions of powder on a copper substrate, parameters of cold spray process included 0.1 to 0.2 gr at 500° C. at 100 psi.

Powder Processing Conditions

A crushed ribbon NdFeB powder (MQP-B+, Neo Performance Materials, Magnequench, Singapore) was subjected to two, separate high energy, planetary ball mill cycles. Twenty grams of powder each was placed into two 100 ml alumina jars with 6 ml of denatured alcohol with 15 10-mm diameter alumina balls plus 20 6-mm diameter alumina balls. An Across International PQNO4 (Across International, Livingston, NJ) was used. Each cycle was run at 600 rpm, with alternating direction, 30 minute cycles for a total of three hrs for each cycle (6 directional cycles).

After each cycle, the milled material was dried at 60° C. for 12 hrs, then sieved through a 400 mesh sieve. The dried and sieved powder was then hand mixed with IM30K microspheres (3M, St. Paul, MN) in the following ratio: 9.16 g of milled powder with 0.48 g dried IM30K.

Figure 10A:
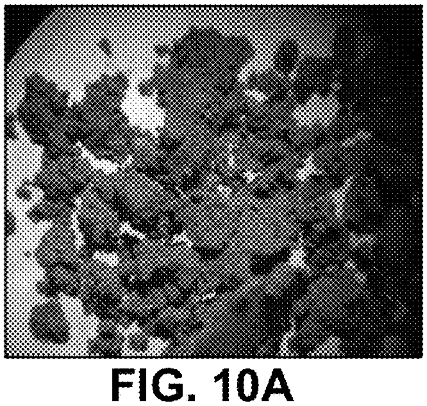
FIG. 10A is a photographic image of a high energy ball milled powder with microspheres, according to one aspect of an inventive concept.

As shown in the image of FIG. 10A, the HEBM powder with microspheres was very cohesive, slightly less after the addition of the microspheres, but still clumping into larger balls that do not uniformly get pulled into the cold spray nozzle. Volumetrically, in the powder, the microspheres are a very small percentage.

Table 2a lists the cumulative volume % less than indicated particle size for NdFeB powders that may be used for successful deposition using the cold-spray process as described herein. Table 2a shows the cumulative volume % less than indicated size where volumetrically 10% of NdFeB particles have an equivalent spherical diameter of less than 0.66 μm; that volumetrically 50% of the particles have as measured equivalent-spherical-diameters less than 2.51 μm; and that volumetrically 90% of the particles have an as measured equivalent-spherical-diameter less than 6.43 μm.

Table 2b lists the cumulative number % less than indicated particle size for NdFeB powders that may be used for successful deposition using the cold-spray process as described herein. It is important to note that the measured volumetric percent data was used to calculate a cumulative number percent using this laser diffraction type particle size measurement technique. The number percent data is, therefore, simply representative of the fact that most of the particles in the mix made using the planetary ball milling process may be significantly less than 1.0 μm in equivalent-spherical-dimension. Thus, looking to Table 2b, 10% of NdFeB particles have an equivalent spherical diameter of less than 0.18 μm; that 50% of the particles have as measured equivalent-spherical-diameters less than 0.35 μm; and that 90% of the particles have an as measured equivalent-spherical-diameter less than 0.75 μm.

TABLE 2a

| Volumetric data of particle size | | | |
|---|---|---|---|
| Sample Neodymium-Iron-Boride | Cumulative Volume % less than indicated size | | |
| | D[v, 0.10](μm) | D[v, 0.50](μm) | D[v, 0.90](μm) |
| TTEC-NdFeB -2M | 0.66 | 2.51 | 6.43 |

TABLE 2b

| Number of particles | | | |
|---|---|---|---|
| Neodymium-Iron-Boride | Cumulative Number % less than indicated size | | |
| | D[n, 0.10](μm) | D[n, 0.50](μm) | D[n, 0.90](μm) |
| TTEC-NdFeB -2M | 0.18 | 0.35 | 0.75 |

The cold spray parameters used were: Nitrogen gas at ~515° C., gas pressure at 100 psi, approximately 7-8 g of powder was hand fed into cold spray nozzle, and substrate was copper abraded with 60 grit paper.

The powder had cooled to an ambient temperature of about room temperature (approximately 24° C.) with a relative humidity of about 80% prior to spraying. The sprayed sample was coated with a protectant (e.g., butyl acetate, ethyl acetate, nitrocellulose, etc.) after cooling.

Figure 10B:
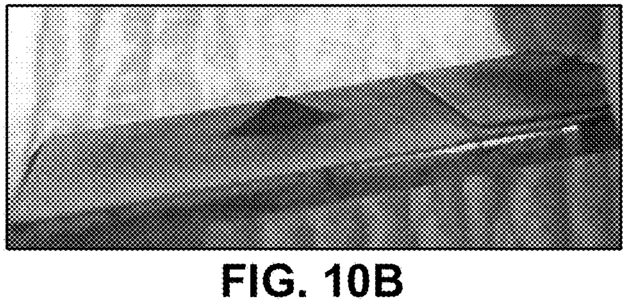
FIG. 10B-10C are images of a product of cold sprayed NdFeB, according to one aspect of an inventive concept.
Figure 10C:
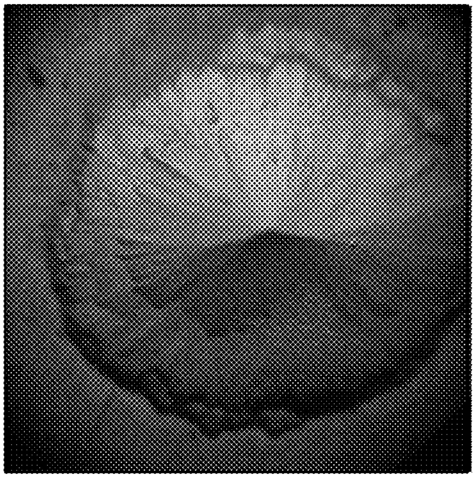

FIG. 10B is an image of a side perspective view of the cold sprayed HEBM powder deposited on a substrate. FIG. 10C is an image of a top down view of the cold sprayed HEBM powder deposited on a substrate.

Properties of Cold Sprayed Magnetic Material

Figure 11:
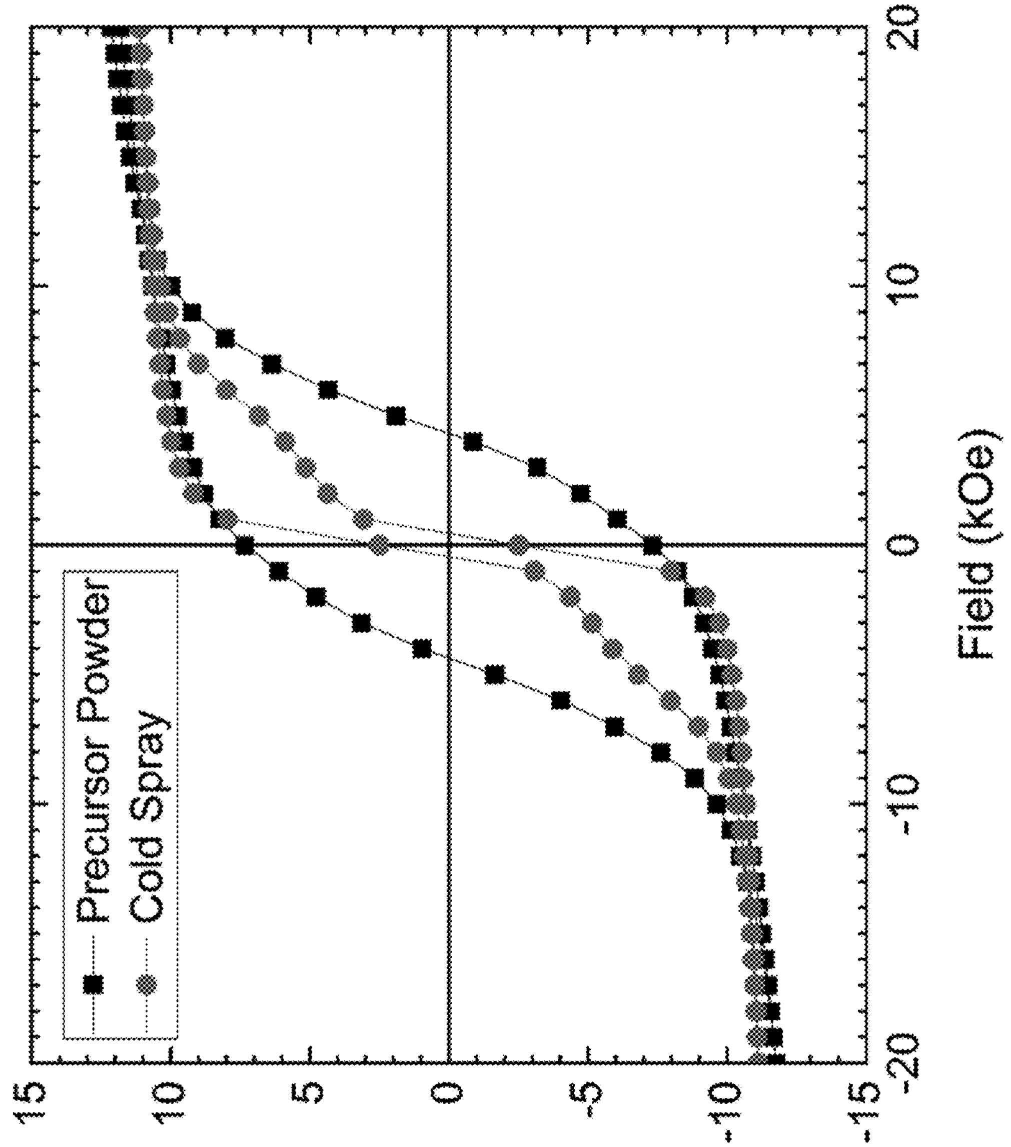
FIG. 11 is a plot of magnetization of precursor powder and cold sprayed powder, according to one aspect of an inventive concept.

FIG. 11 is a plot of the magnetization of a precursor powder and a part formed from the precursor powder using the cold sprayed techniques described herein. As shown in the plot, the remnant magnetization of the precursor powder (■) is about 7.3 kilo-Gauss (kG), and the remnant magnetization of the part formed from the precursor powder by the cold spray techniques described herein (●) is about 2.5 kG, thereby showing that following cold spray deposition, the powder retains magnetization.

Table 3 compares the properties of the magnetic part ("Sprayed powder") formed by cold spray techniques described herein, including properties of a coercive region of the Sprayed Powder, and the Spray Precursor Powder, the powder prior to spraying. In addition, properties of magnets formed by conventional methods of sintering "Sintered NdFeB" and bonding with filler "Bonded NdFeB."

The density of the Sprayed Powder magnetic material having nearly pure NdFeB material is comparable to Sintered NdFeB magnets. The remnant magnetization of the Sprayed Powder magnetic material is comparable to the Bonded NdFeB magnets thereby showing preservation of the microstructure enhancing remnant magnetization of the product.

In Use

The ability to produce near net shape magnets can be expected to enable new motor topologies leading to improved efficiencies and higher power to weight ratios. Small net shape magnets have applications in many transducers and sensors, such as ear buds. However, small sized magnets can have material losses of 60-80% so net shape approaches to these magnets can lead to manufacturing efficiencies.

TABLE 3

Properties of magnetic material

| Type of Magnet | Density (g/cc) | Volume Fraction NdFeB | Coercivity (kOe) | Remnant Magnetization (kG) |
|---|---|---|---|---|
| Spray Precursor Powder | 7.5 | 100 | 4.4 | 7.3 |
| Sprayed Powder | 7.5 | >90 | 0.45 | 2.5 |
| Sprayed Powder Coercive Region | 7.5 | >90 | 4 | — |
| Sintered NdFeB - high temperature | 7.5 | 100 | 33 | 12.4 |
| Sintered NdFeB - high performance | 7.5 | 100 | 13 | 14.5 |
| Bonded NdFeB | 6.1 | 78 | 10 | 6.8 |

Various aspects of an inventive concept described herein will improve magnetic performance of magnetic microstructures for energy security with current increasing demands for permanent magnets in, for example, motors and direct-drive wind turbines, as well as further expanding advanced manufacturing.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of inventive concepts have been described above, it should be understood that they have been presented by way of example only, and not limitation. Thus, the breadth and scope of one aspect of an inventive concept of the present invention should not be limited by any of the above-described exemplary aspects of inventive concepts, but should be defined only in accordance with the following claims and their equivalents.

What is claimed is:

1. A product, comprising:

a substrate; and a layer of material formed on the substrate from a precursor powder, the layer consisting of:

a plurality of brittle particles, and less than 8 wt. % of an additive that aids flowing of the brittle particles if the additive is present, wherein the material has structural characteristics of impaction of the brittle particles on the substrate and/or on previously deposited brittle particles, wherein at least one of the structural characteristics of impaction includes some of the brittle particles having a deformed shape, wherein the deformed shape is different than a shape of the respective brittle particle before impaction, wherein the brittle particles have a microstructure, wherein the microstructure of the brittle particles is substantially the same as a microstructure of particles of the precursor powder, the microstructure of the brittle particles being characterized by at least one property, wherein the at least one property is substantially the same as a corresponding at least one property of the particles of the precursor powder.

2. A product as recited in claim 1, wherein the material comprises a magnetic material, wherein the at least one property is selected from the group consisting of:

coercivity, remnant magnetization, and density.

3. A product as recited in claim 1, wherein the plurality of brittle particles comprises particles generated from a ferroic material.

4. A product as recited in claim 1, wherein the plurality of brittle particles comprises particles generated from a multiferroic material having at least two materials selected from the group consisting of: a ferromagnet material, a ferroelastic material, a ferroelectric material, and a ferrotoroidic material.

5. A product as recited in claim 1, wherein a thickness of the material is in a range of greater than about 10 microns and less than about one centimeter.

6. A product as recited in claim 1, wherein the material is a coating on the substrate having a complex shape.

7. A product as recited in claim 1, wherein the precursor powder does not include a binder material.

8. A product as recited in claim 1, wherein one of the structural characteristics includes some of the brittle particles being adhered directly to one another.

9. A product as recited in claim 1, wherein the material is a non-ductile material.

10. A product as recited in claim 1, wherein some of the structural characteristics include some of the brittle particles being embedded in the substrate and/or the previously deposited brittle particles.

11. A product as recited in claim 1, wherein the additive, if present, comprises hollow glass microspheres, the additive being present in a concentration of less than 5 wt. %.

12. A product as recited in claim 1, wherein none of the additive is present in the material.

13. A product as recited in claim 1, wherein the material includes at least one material selected from the group consisting of: a magnetocaloric material, a thermoelectric material, a semiconductor material, an ionic material, and an ionic semiconductor material.

14. A product, comprising:

a substrate; and a layer formed on the substrate, the layer comprising:

a plurality of brittle particles, the brittle particles comprising metal particles which are the only metal particles in the layer, and less than 8 wt. % of an additive that aids flowing of the brittle particles if the additive is present, wherein the brittle particles have structural characteristics of impaction on the substrate and/or on previously deposited brittle particles, wherein at least one of the structural characteristics of impaction includes some of the brittle particles having a deformed shape, wherein the deformed shape is different than a shape of the respective brittle particle before impaction, wherein the brittle particles have a microstructure, wherein the microstructure of the brittle particles is substantially the same as a microstructure of the brittle particles prior to impaction, the microstructure of the brittle particles being characterized by at least one property, wherein the at least one property is substantially the same as a corresponding at least one property of the brittle particles prior to impaction.

15. A product as recited in claim 14, further comprising a second layer, wherein the second layer is positioned above the layer, the layer and the second layer having different compositions, wherein each layer has at least one property selected from the group consisting of: remnant magnetization, coercivity, switchable deformation, and density, wherein the layer has at least one different property than the second layer.

16. A product as recited in claim 14, wherein the layer consists of the brittle particles.

17. A product as recited in claim 14, wherein the layer includes at least one material selected from the group consisting of: a magnetocaloric material, a thermoelectric material, a semiconductor material, an ionic material, and an ionic semiconductor material.

18. A product, comprising:

a substrate; and a layer formed on the substrate, the layer consisting of a plurality of brittle particles, and, an additive that aids flowing of the brittle particles, wherein the additive is present in a concentration of less than 8 wt. % of the layer, wherein at least some of the brittle particles are adhered to one another and/or to the substrate, wherein the brittle particles have structural characteristics of impaction on the substrate and/or on previously deposited brittle particles, wherein at least one of the structural characteristics of impaction includes some of the brittle particles having a deformed shape, wherein the deformed shape is different than a shape of the respective brittle particle before impaction.

19. A product as recited in claim 18, wherein the brittle particles comprise a magnetic material.

20. A product as recited in claim 18, wherein the brittle particles comprise a ferroic material.

21. A product as recited in claim 18, wherein the plurality of brittle particles comprises particles generated from a multiferroic material having at least two materials selected from the group consisting of: a ferromagnet material, a ferroelastic material, a ferroelectric material, and a ferrotoroidic material.

22. A product as recited in claim 18, wherein the additive comprises hollow glass microspheres, the additive being present in a concentration of less than 5 wt. % of the layer.

23. A product as recited in claim 18, further comprising a second layer, wherein the second layer is positioned above the layer, wherein the layer and the second layer have different compositions.

* * * * *